(12) United States Patent
Uehara

(10) Patent No.: US 12,124,018 B2
(45) Date of Patent: Oct. 22, 2024

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Takeru Uehara, Ageo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 18/100,760

(22) Filed: Jan. 24, 2023

(65) Prior Publication Data

US 2023/0161141 A1 May 25, 2023

Related U.S. Application Data

(62) Division of application No. 16/622,910, filed as application No. PCT/JP2018/023525 on Jun. 20, 2018, now Pat. No. 11,592,651.

(30) Foreign Application Priority Data

Jun. 21, 2017 (JP) .................................. 2017-121577

(51) Int. Cl.
*G02B 15/14* (2006.01)
*G02B 13/18* (2006.01)
(Continued)

(52) U.S. Cl.
CPC ......... *G02B 15/1445* (2019.08); *G02B 13/18* (2013.01); *G02B 15/1435* (2019.08);
(Continued)

(58) Field of Classification Search
None
See application file for complete search history.

(56) References Cited

U.S. PATENT DOCUMENTS

| 4,687,302 A | 8/1987 | Ikemori et al. |
| 2005/0259329 A1 | 11/2005 | Yagyu et al. |

(Continued)

FOREIGN PATENT DOCUMENTS

| JP | S60-31110 A | 2/1985 |
| JP | H07-306362 A | 11/1995 |

(Continued)

OTHER PUBLICATIONS

International Search Report from International Patent Application No. PCT/JP2018/023525, Sep. 25, 2018.

(Continued)

*Primary Examiner* — Darryl J Collins
(74) *Attorney, Agent, or Firm* — Potomac Law Group, PLLC

(57) ABSTRACT

A zoom optical system consists of a first lens group having negative refractive power, a second lens group having positive refractive power, and a rear lens group which are disposed in order from an object. The rear lens group comprises a last lens group and an F lens group in order from a side closest to an image. Lens groups forming the first lens group, the second lens group, and the rear lens group are configured in such a manner that, upon zooming, the respective lens groups move and a distance between the lens groups adjacent to each other changes. At least a part of the F lens group is configured to move upon focusing. Further, the following conditional expression is satisfied.

$$-0.220 < f1/fE < 0.280$$

where f1: a focal length of the first lens group, and
fE: a focal length of the last lens group.

15 Claims, 26 Drawing Sheets

(51) Int. Cl.
   *G02B 15/20* (2006.01)
   *G03B 5/00* (2021.01)
(52) U.S. Cl.
   CPC ............... *G02B 15/143507* (2019.08); *G02B 15/144503* (2019.08); *G02B 15/144507* (2019.08); *G02B 15/145507* (2019.08); *G02B 15/145523* (2019.08); *G02B 15/20* (2013.01); *G03B 5/00* (2013.01)

(56) References Cited

U.S. PATENT DOCUMENTS

| | | | |
|---|---|---|---|
| 2010/0157106 A1* | 6/2010 | Morooka | G02B 15/144507 359/686 |
| 2010/0194930 A1 | 8/2010 | Miyazaki et al. | |
| 2010/0238560 A1 | 9/2010 | Fujimoto | |
| 2012/0229692 A1 | 9/2012 | Matsumura | |
| 2012/0250161 A1 | 10/2012 | Yanai et al. | |
| 2013/0235465 A1 | 9/2013 | Arimoto | |
| 2014/0028891 A1 | 1/2014 | Otake et al. | |
| 2014/0098253 A1* | 4/2014 | Maetaki | G02B 15/22 359/557 |
| 2014/0320976 A1 | 10/2014 | Nakahara | |
| 2015/0077594 A1 | 3/2015 | Nakahara | |
| 2015/0097989 A1 | 4/2015 | Kai et al. | |
| 2015/0253550 A1 | 9/2015 | Hosoi | |
| 2015/0281588 A1 | 10/2015 | Izuhara et al. | |
| 2016/0170189 A1 | 6/2016 | Fujimoto et al. | |
| 2016/0341939 A1 | 11/2016 | Koida | |
| 2016/0356997 A1 | 12/2016 | Inomoto | |
| 2024/0061221 A1* | 2/2024 | Machida | G02B 15/163 |

FOREIGN PATENT DOCUMENTS

| | | |
|---|---|---|
| JP | 2005-338143 A | 12/2005 |
| JP | 2005-338344 A | 12/2005 |
| JP | 2010-176096 A | 8/2010 |
| JP | 2010-217535 A | 9/2010 |
| JP | 2011-081062 A | 4/2011 |
| JP | 2012-198503 A | 10/2012 |
| JP | 2012-208378 A | 10/2012 |
| JP | 2013-156477 A | 8/2013 |
| JP | 2013-160981 A | 8/2013 |
| JP | 2014-206674 A | 10/2014 |
| JP | 2015-031869 A | 2/2015 |
| JP | 2015-045839 A | 3/2015 |
| JP | 2015-121768 A | 7/2015 |
| JP | 2015-166834 A | 9/2015 |
| JP | 2017-003646 A | 1/2017 |

OTHER PUBLICATIONS

English Translation of International Preliminary Report on Patentability (including Written Opinion of the ISA) from International Patent Application No. PCT/JP2018/023525, Jan. 2, 2020.
Office Action issued Jun. 23, 2020, in Japanese Patent Application No. 2017-121577.
Office Action issued Feb. 16, 2021, in Japanese Patent Application No. 2017-121577.
Office Action issued Jun. 2, 2021, in Chinese Patent Application No. 201880041461.X.
Office Action issued Jan. 11, 2022, in Chinese Patent Application No. 201880041461.X.

* cited by examiner

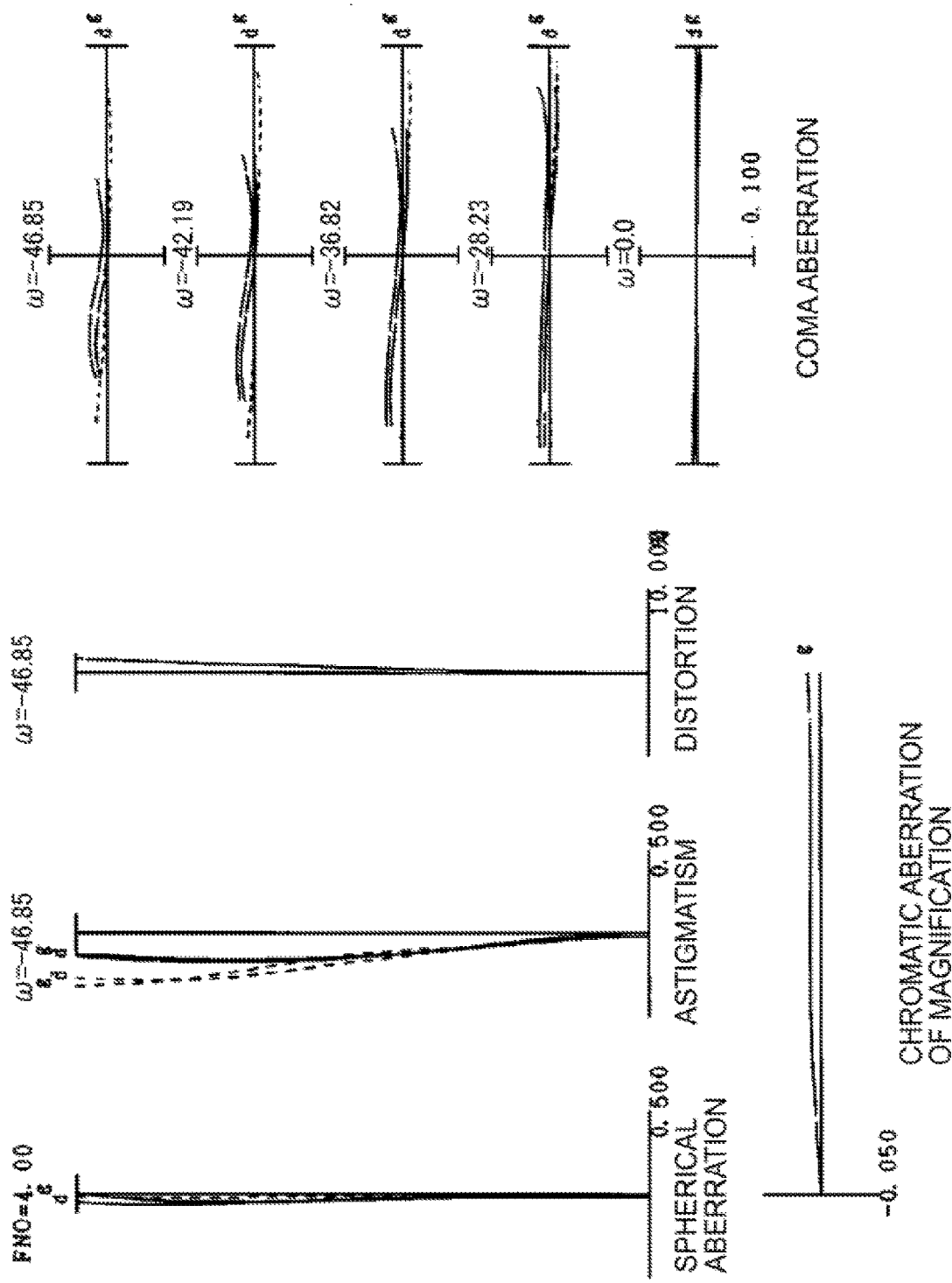

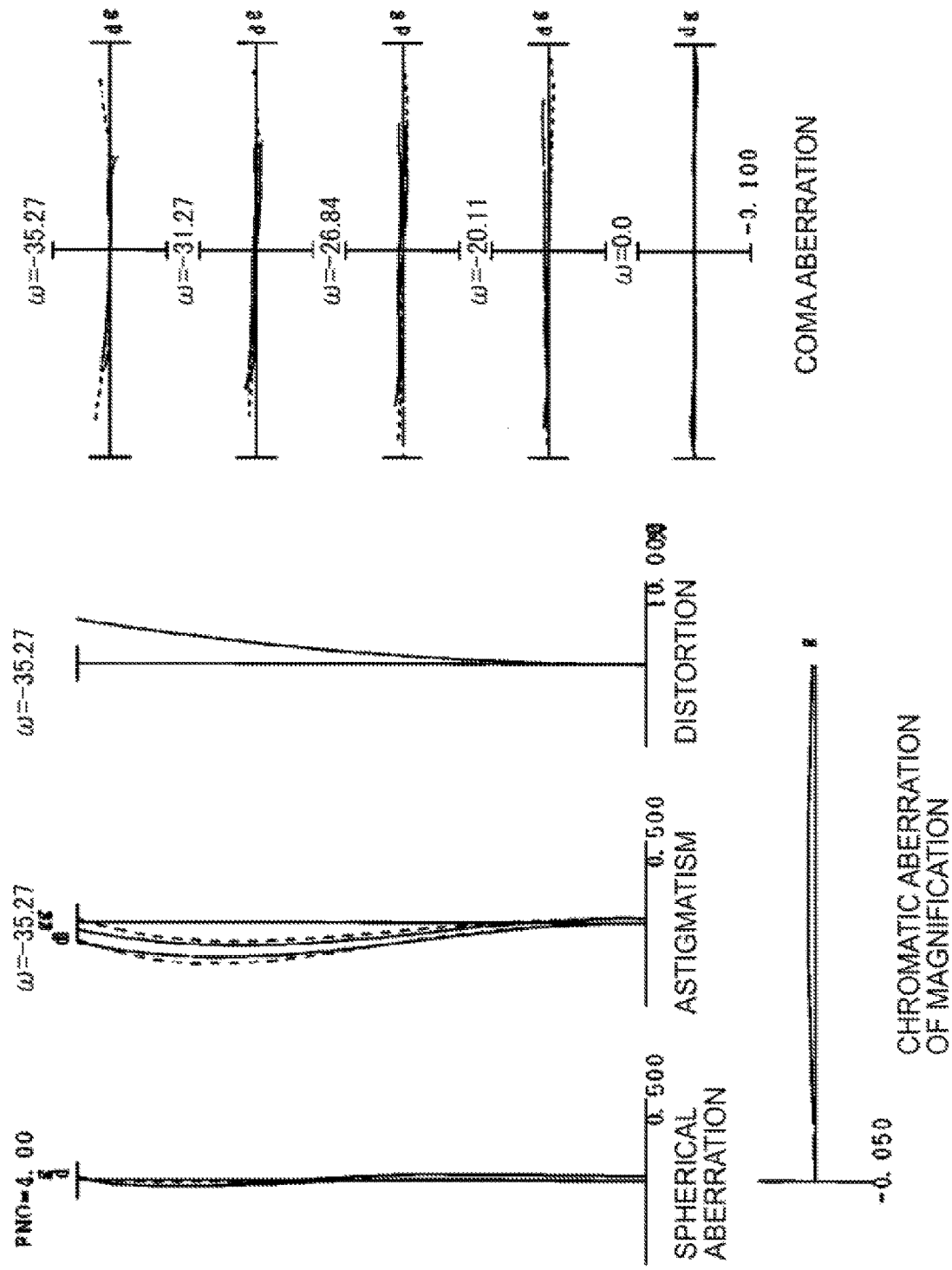

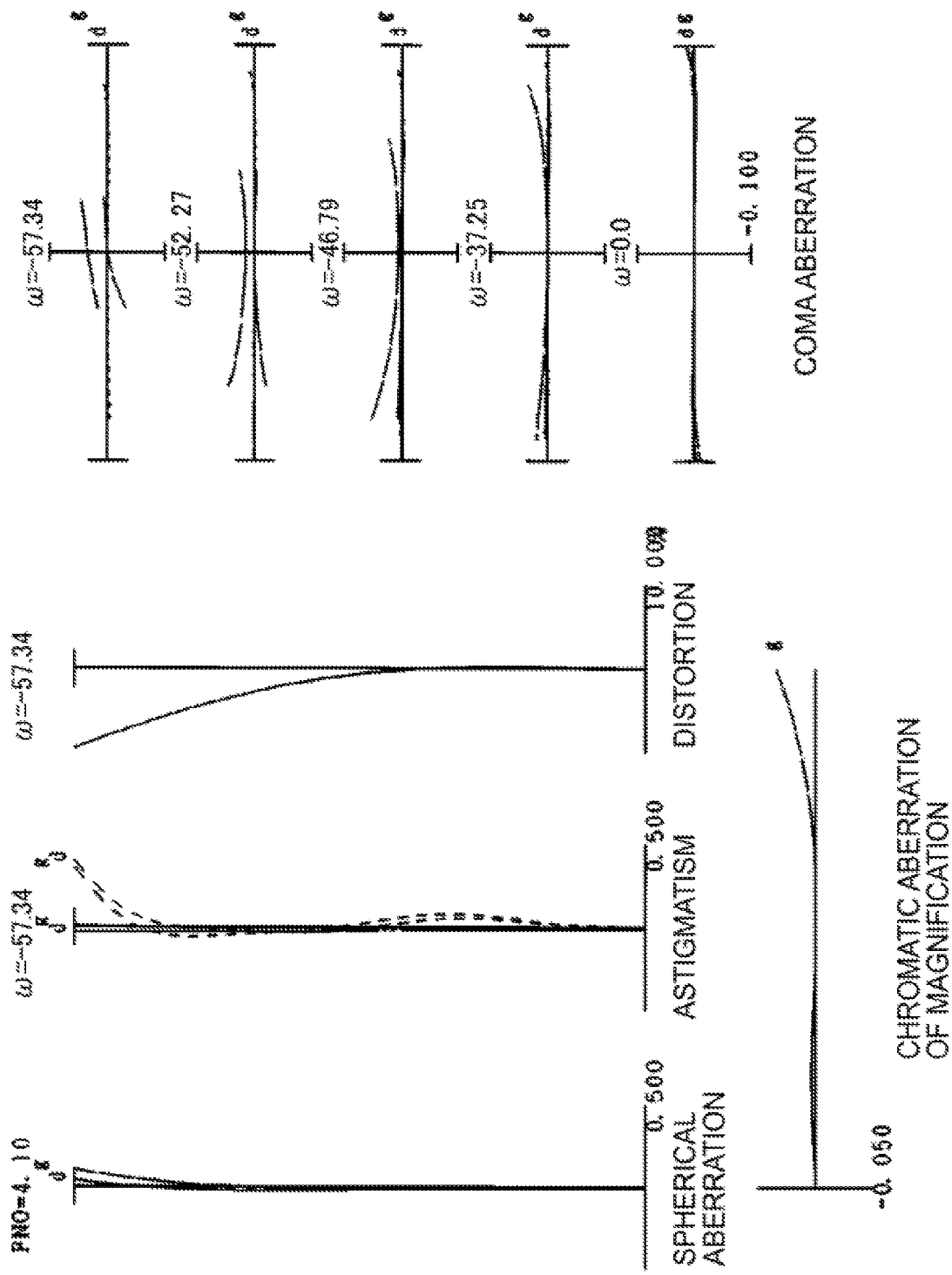

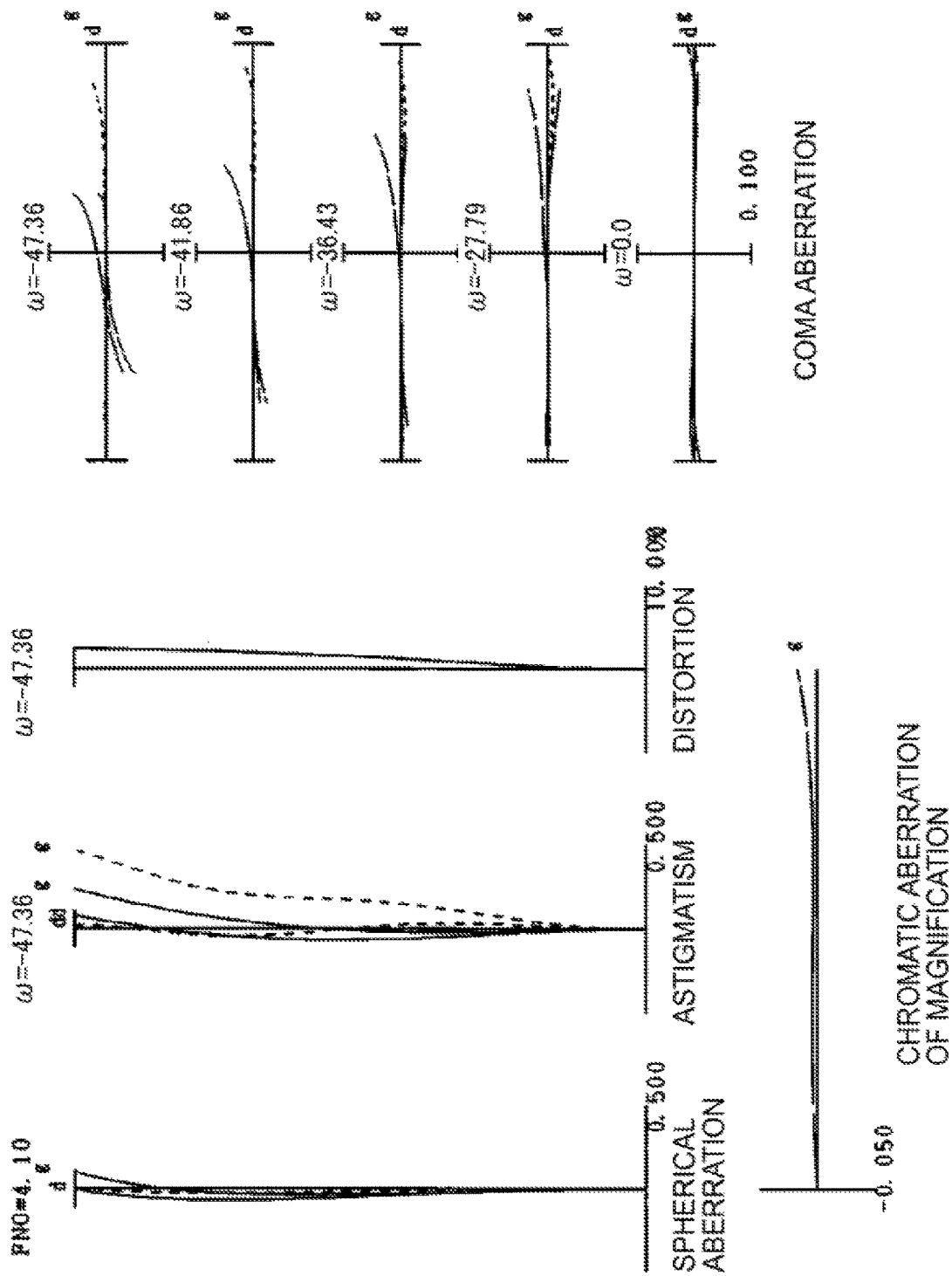

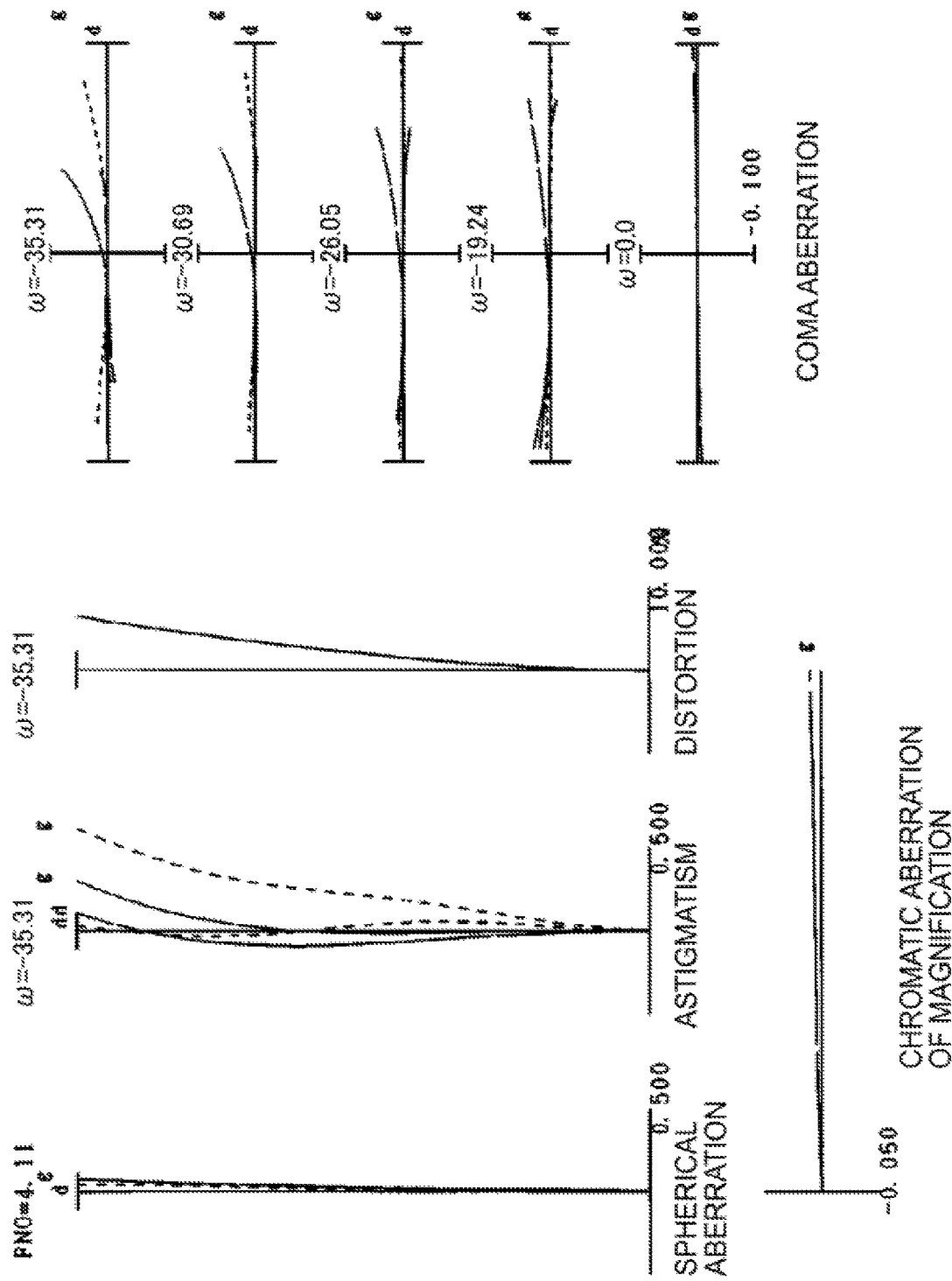

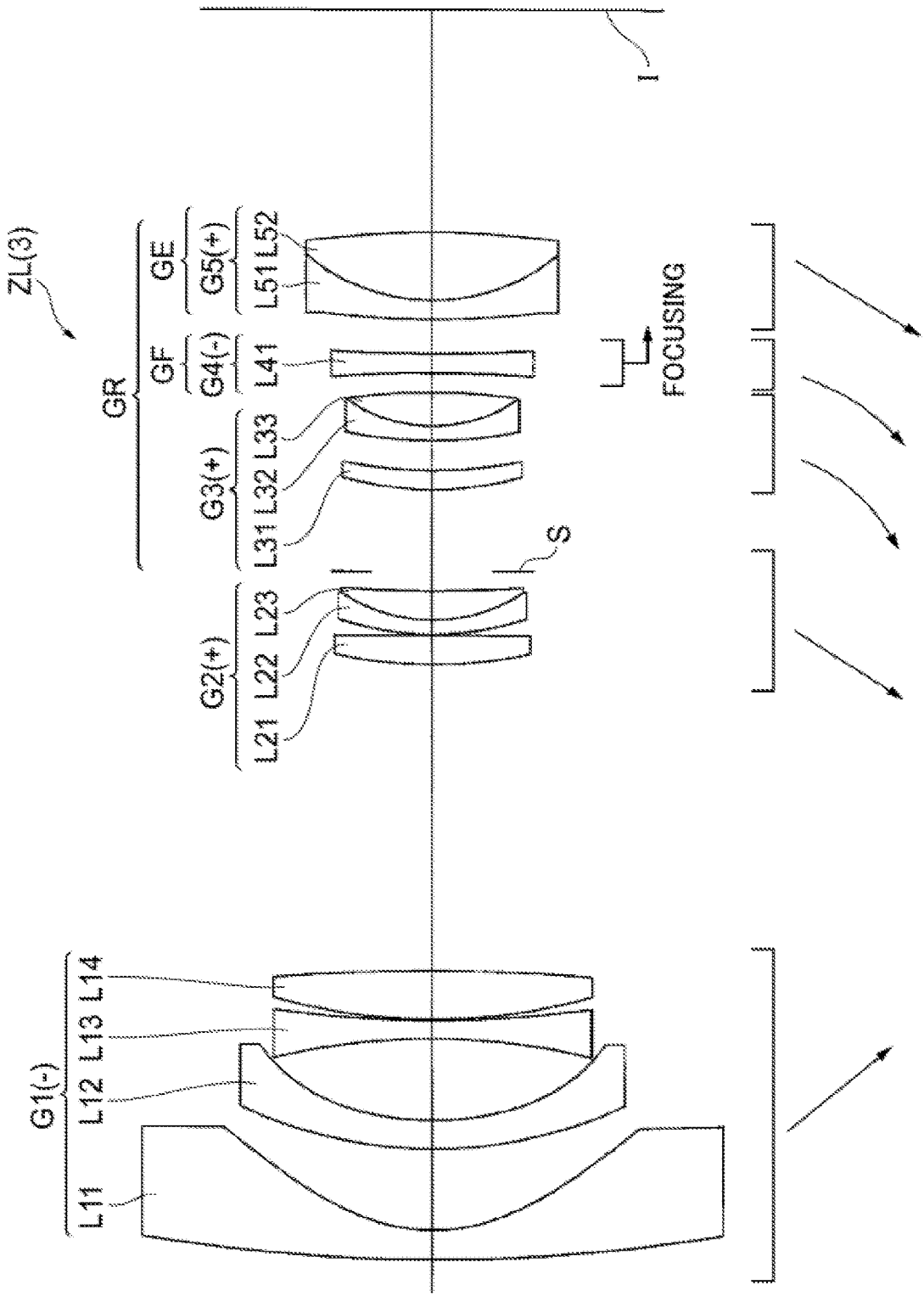

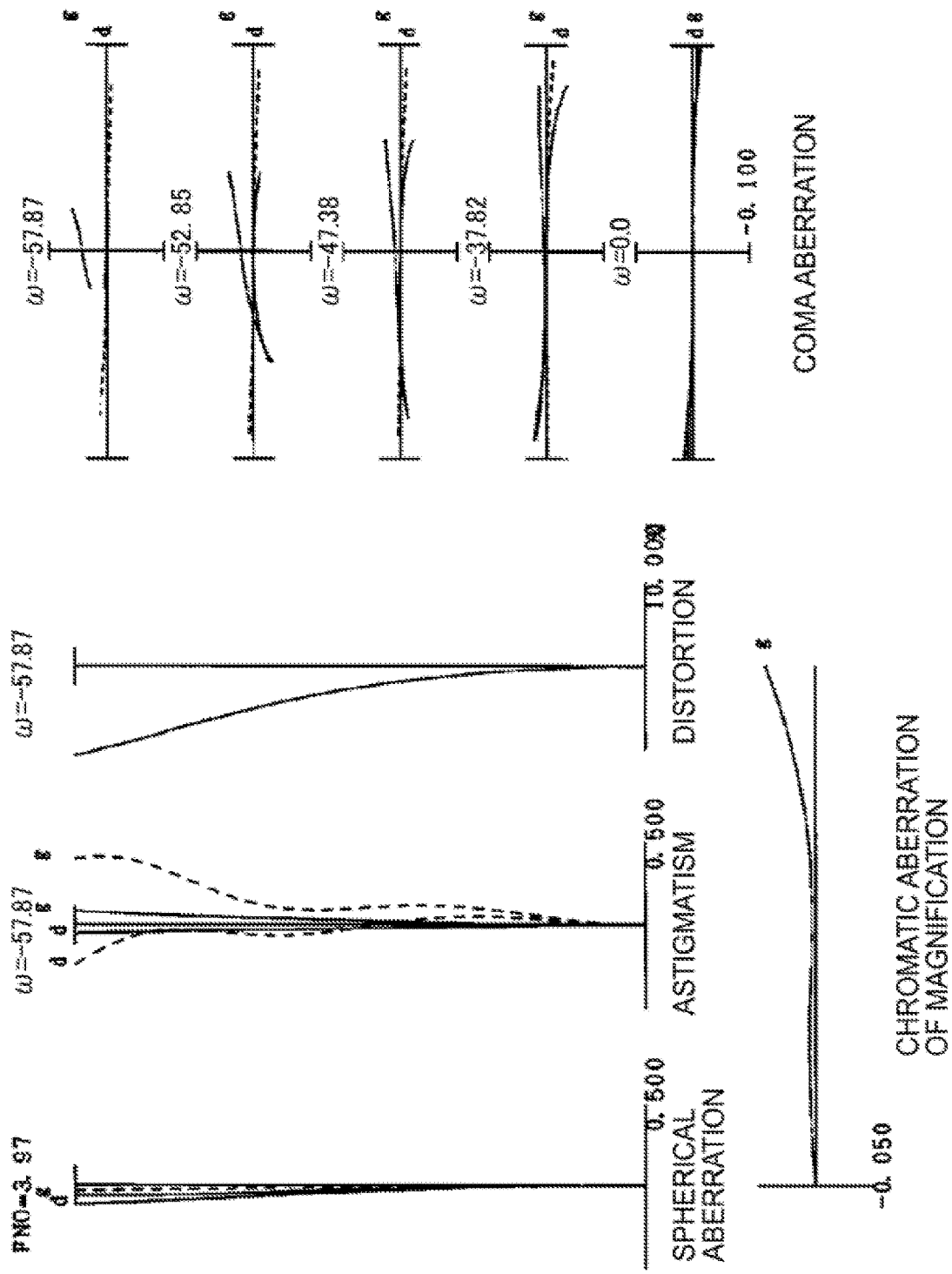

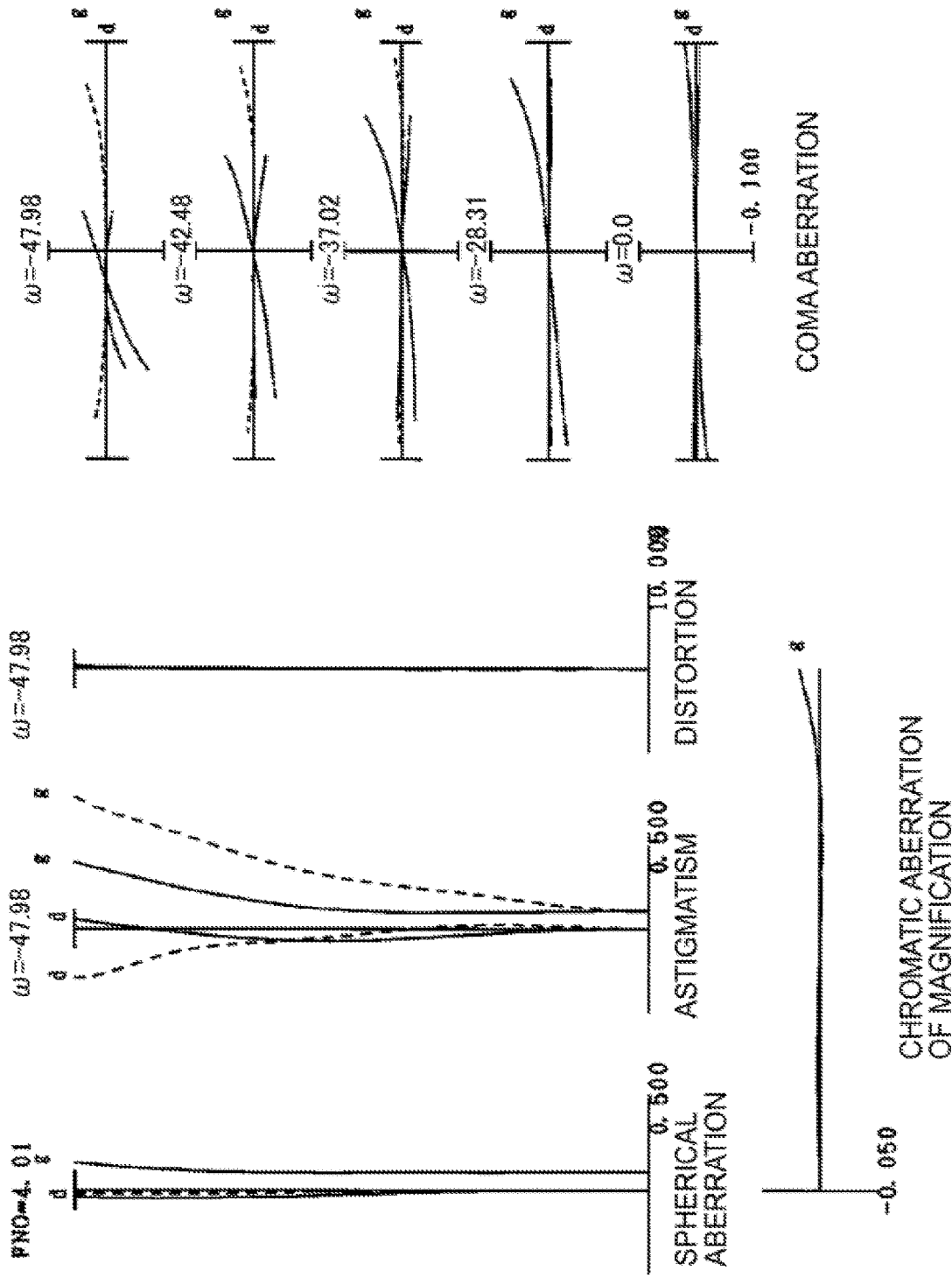

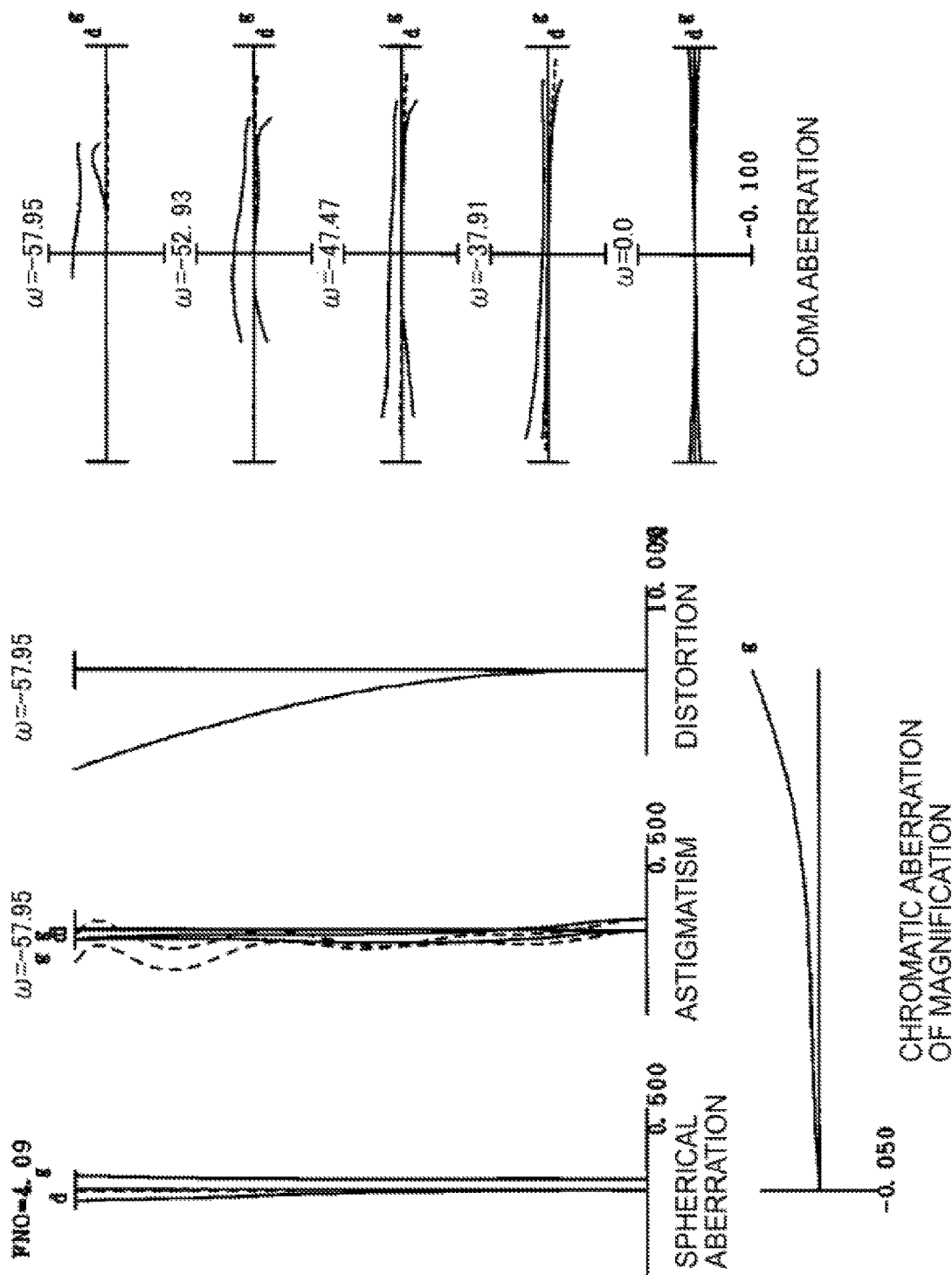

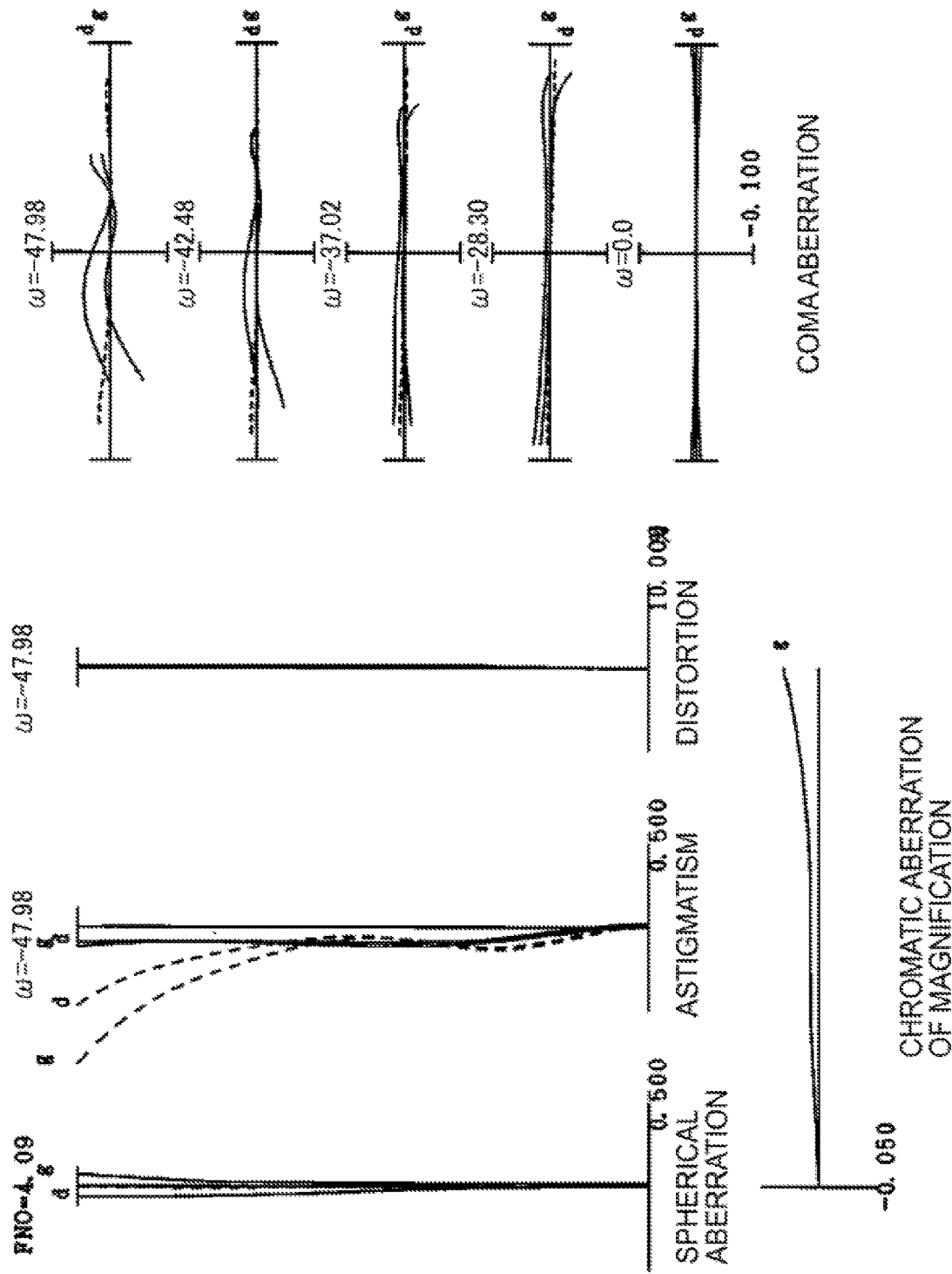

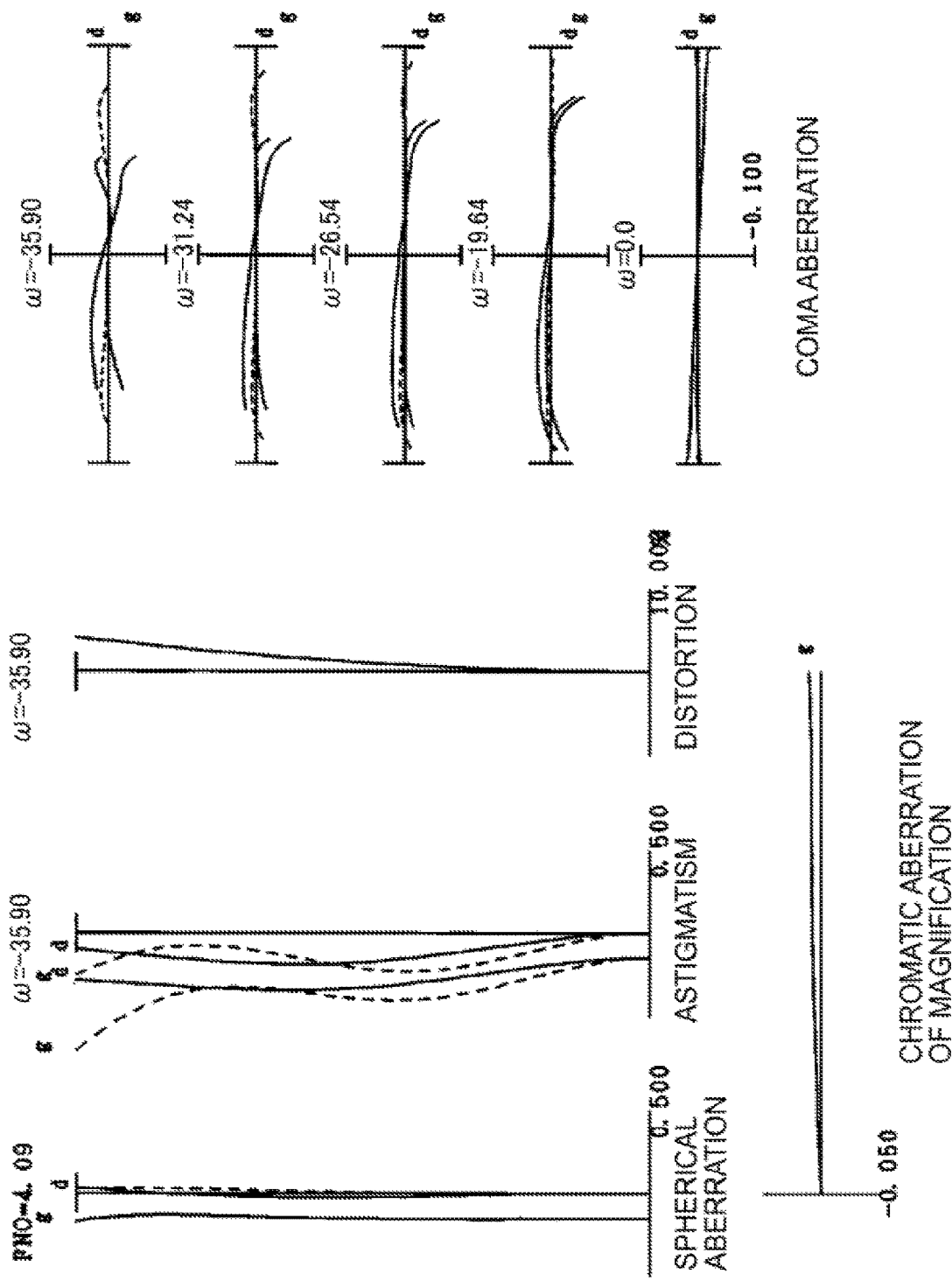

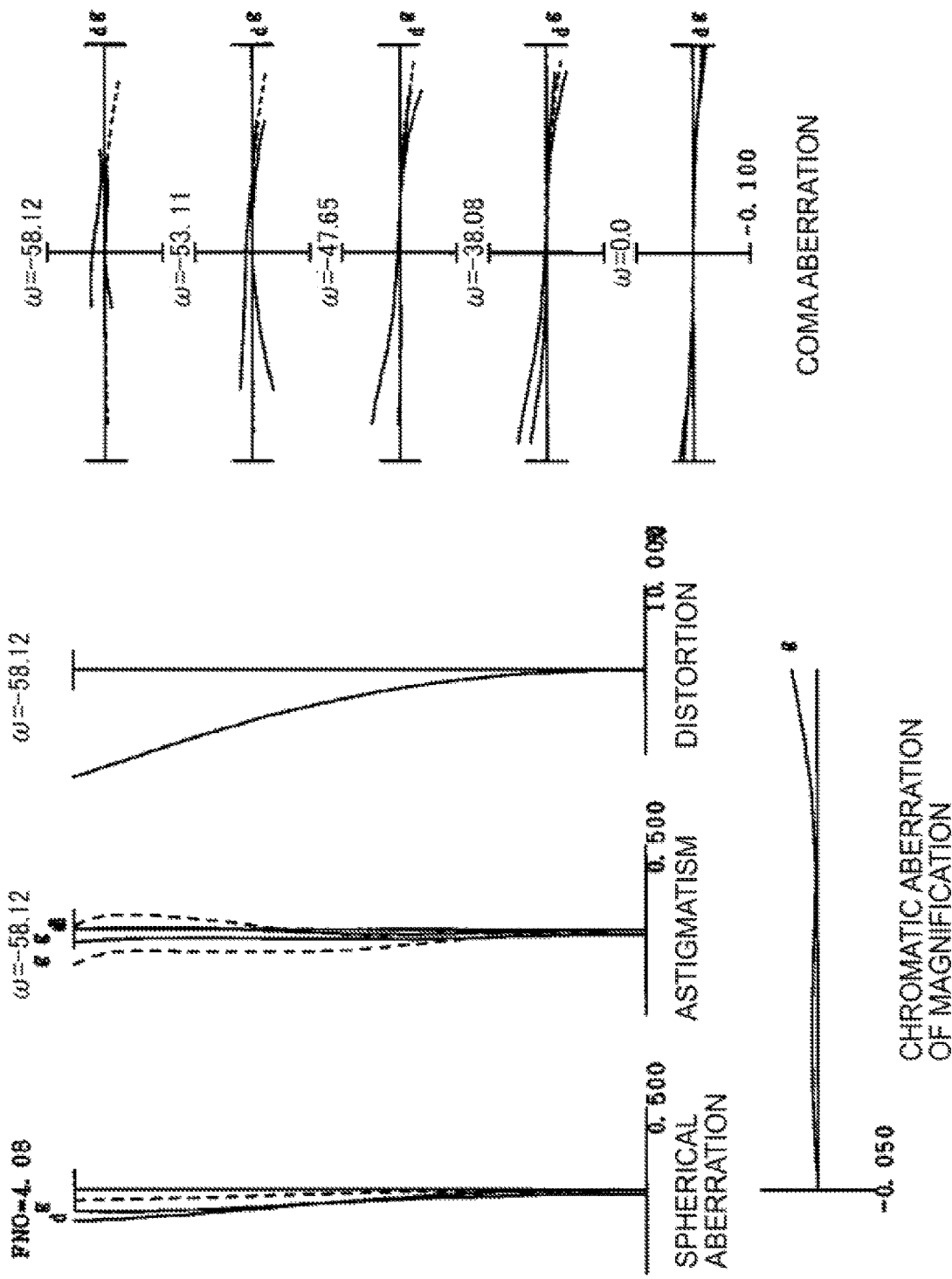

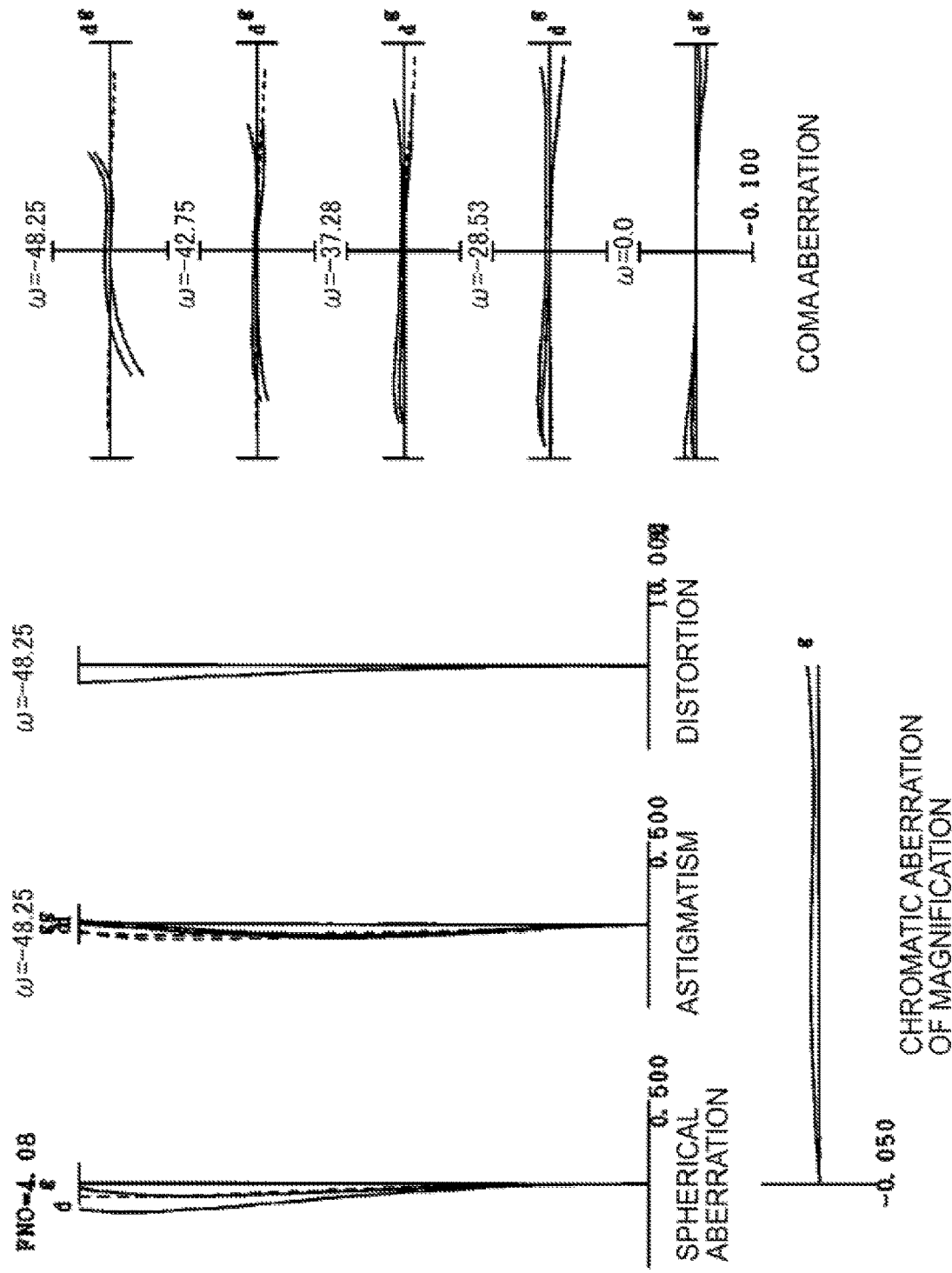

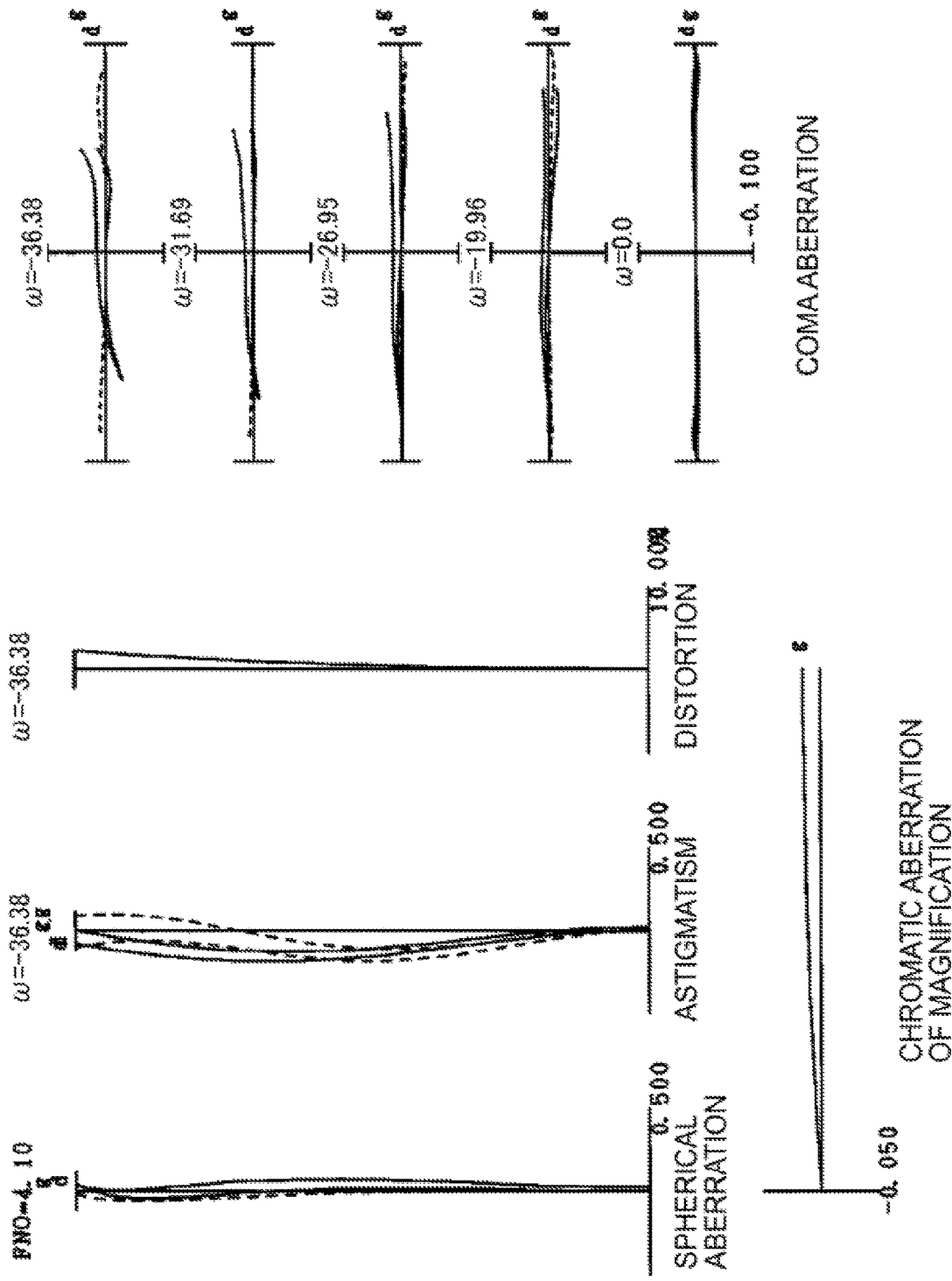

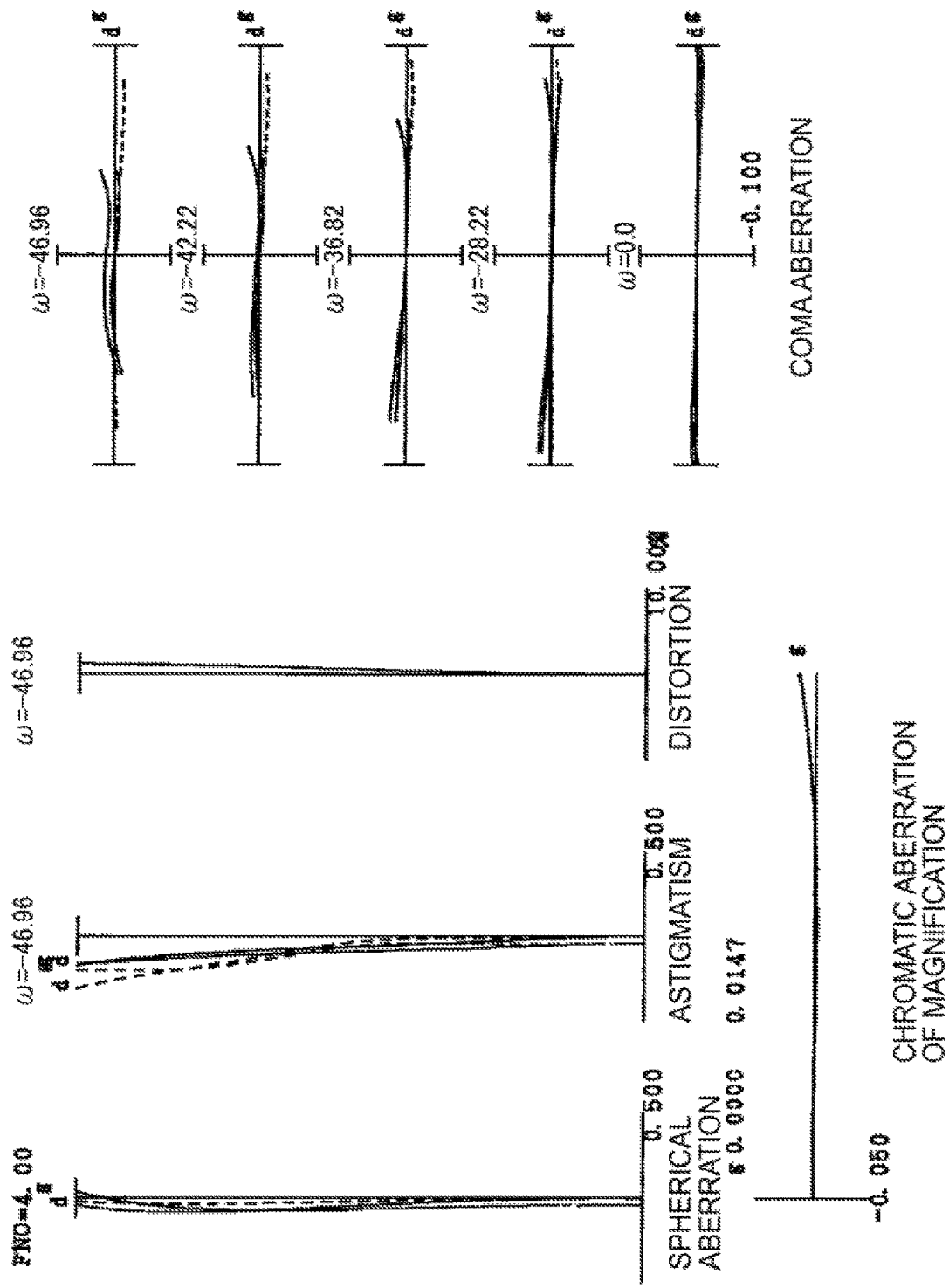

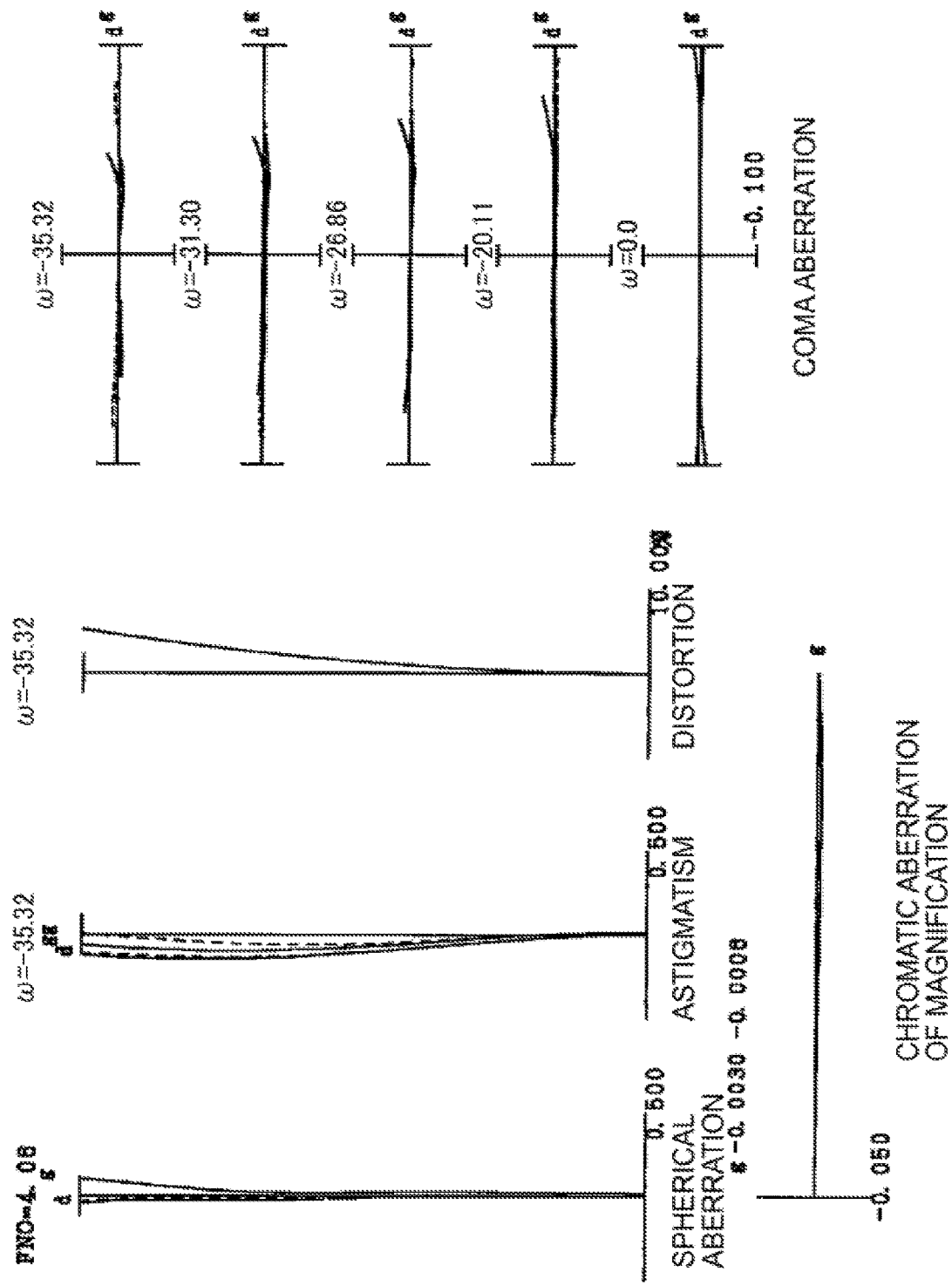

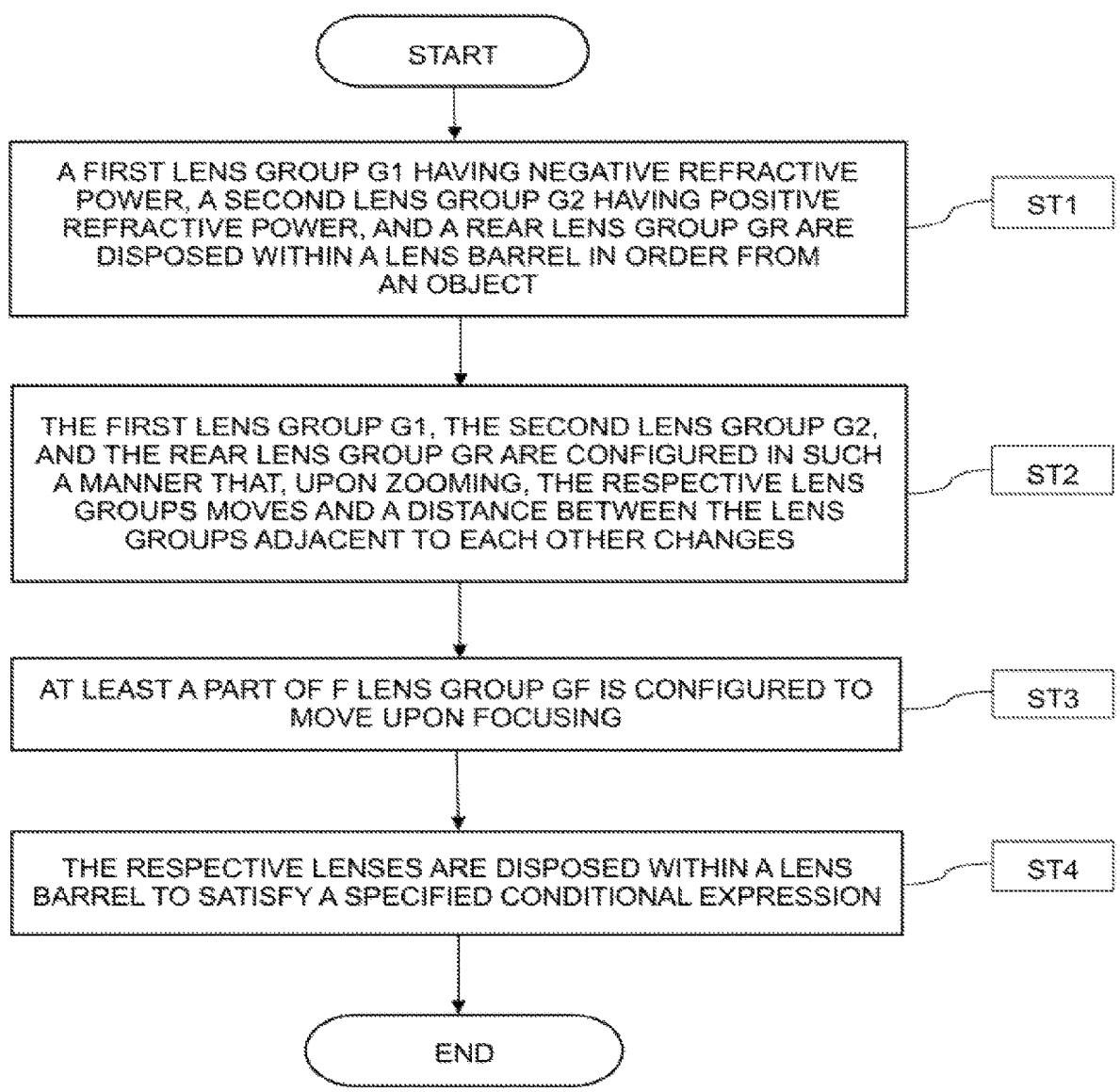

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus using the zoom optical system, and a method for manufacturing the zoom optical system.

TECHNICAL BACKGROUND

Conventionally, a zoom optical system suitable for a photographic camera, an electronic still camera, a video camera, and the like has been proposed (for example, see Patent literature 1). The conventional zoom optical system has a problem that an angle of view is narrow in a wide angle end state and a variation of aberration is large upon zooming.

PRIOR ARTS LIST

Patent Document

Patent literature 1: Japanese Laid-Open Patent Publication No. 2015-166834 (A)

SUMMARY OF THE INVENTION

A zoom optical system (zoom lens) according to the present invention consists of a first lens group having negative refractive power, a second lens group having positive refractive power, and a rear lens group which are disposed in order from an object. In the zoom optical system, the rear lens group comprises a last lens group and an F lens group in order from a side closest to an image, lens groups forming the first lens group, the second lens group, and the rear lens group are configured in such a manner that, upon zooming, the respective lens groups move and a distance between the lens groups adjacent to each other changes, at least a part of the F lens group is configured to move upon focusing, and a following conditional expression is satisfied.

$$-0.220 < f1/fE < 0.280$$

where f1: a focal length of the first lens group, and
fE: a focal length of the last lens group.

An optical apparatus according to the present invention is configured such that the zoom optical system is mounted.

A method for manufacturing a zoom optical system according to the present invention is a method for manufacturing a zoom optical system consisting of a first lens group having negative refractive power, a second lens group having positive refractive power, and a rear lens group, which are disposed in order from an object, the method comprising disposing the first lens group, the second lens group, and the rear lens group in a barrel such that the rear lens group includes a last lens group and an F lens group in order from a side closest to an image, lens groups forming the first lens group, the second lens group, and the rear lens group are configured in such a manner that, upon zooming, the respective lens groups move and a distance between the lens groups adjacent to each other changes, at least apart of the F lens group is configured to move upon focusing, and a following conditional expression is satisfied.

$$-0.220 < f1/fE < 0.280$$

where f1: a focal length of the first lens group, and
fE: a focal length of the last lens group.

BRIEF DESCRIPTION OF THE DRAWINGS

FIGS. 2A, 2B, and 2C are various aberration graphs of the zoom lens according to Example 1 in a wide angle end state, an intermediate focal length state, and a telephoto end state, respectively;

FIGS. 4A, 4B, and 4C are various aberration graphs of the zoom lens according to Example 2 in a wide angle end state, an intermediate focal length state, and a telephoto end state, respectively;

FIG. 5 is a cross-sectional view illustrating a lens configuration of a zoom lens according to Example 3 of the present embodiment;

FIGS. 6A, 6B, and 6C are various aberration graphs of the zoom lens according to Example 3 in a wide angle end state, an intermediate focal length state, and a telephoto end state, respectively;

FIGS. 8A, 8B, and 8C are various aberration graphs of the zoom lens according to Example 4 in a wide angle end state, an intermediate focal length state, and a telephoto end state, respectively;

FIGS. 10A, 10B, and 10C are various aberration graphs of the zoom lens according to Example 5 in a wide angle end state, an intermediate focal length state, and a telephoto end state, respectively;

FIGS. 12A, 12B, and 12C are various aberration graphs of the zoom lens according to Example 6 in a wide angle end state, an intermediate focal length state, and a telephoto end state, respectively;

FIG. 14 is a flowchart illustrating a method for manufacturing the zoom lens according to the present embodiment.

DESCRIPTION OF THE EMBODIMENTS

Figure 1:
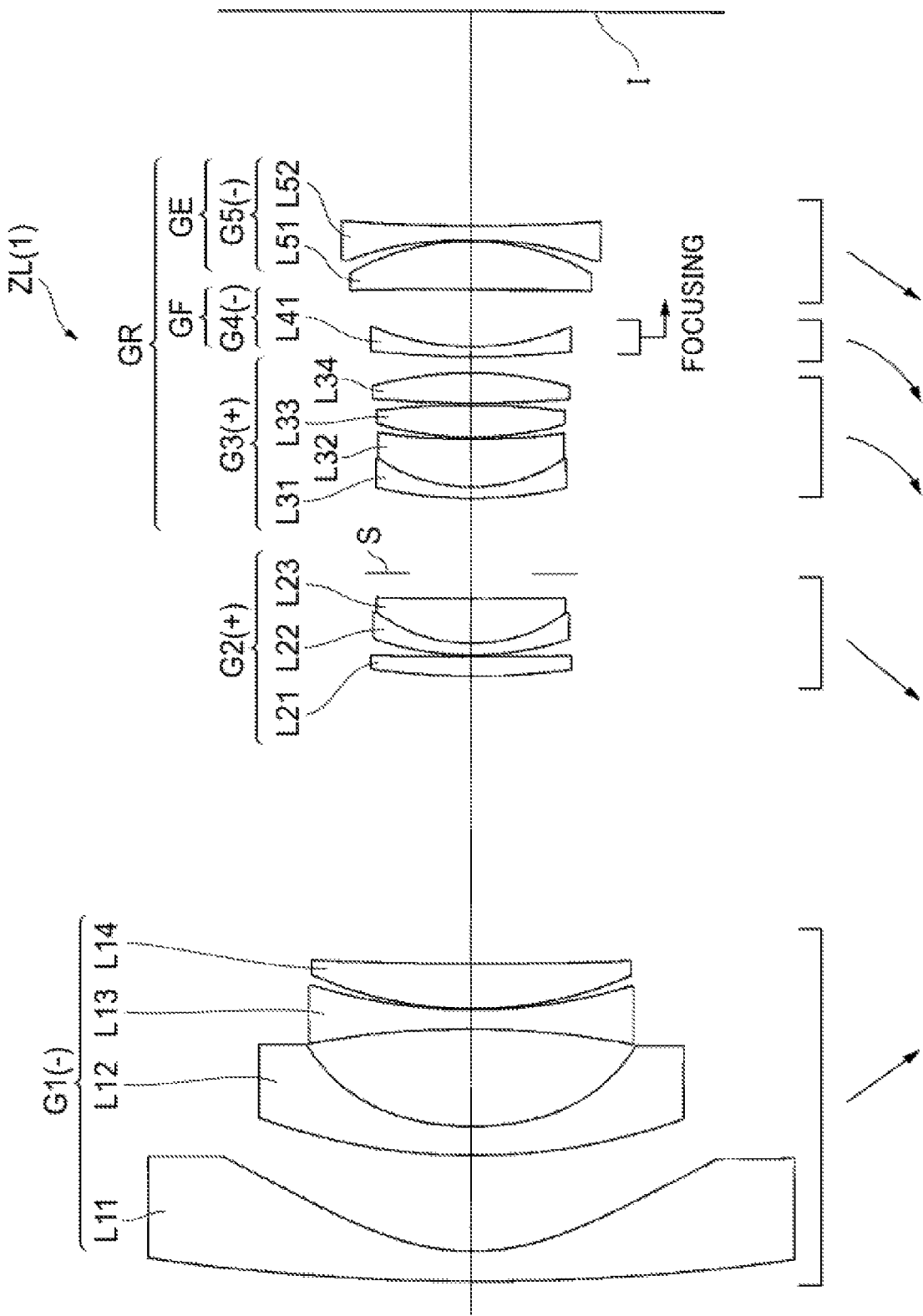
FIG. 1 is a cross-sectional view illustrating a lens configuration of a zoom lens according to Example 1 of the present embodiment.

Embodiments will be described below with reference to the drawings. As an example of a zoom lens (zoom optical system) ZL according to the present embodiment, as illustrated in FIG. 1, a zoom lens ZL(1) consists of a first lens group G1 having negative refractive power, a second lens group G2 having positive refractive power, and a rear lens group GR which are disposed in order from an object. The rear lens group comprises a last lens group GE and an F lens group GF in order from a side closest to an image, lens groups forming the first lens group G1, the second lens group G2, and the rear lens group GR are configured in such a manner that, upon zooming, the respective lens groups move and a distance between the lens groups adjacent to each other changes, and at least a part of the F lens group GF is configured to move upon focusing, thereby performing focusing. The zoom lens ZL according to the present embodiment satisfies a following conditional expression (1) under such a configuration.

$$-0.220 < f1/fE < 0.280 \quad (1)$$

where f1: a focal length of the first lens group G1, and
fE: a focal length of the last lens group GE.

Figure 3:
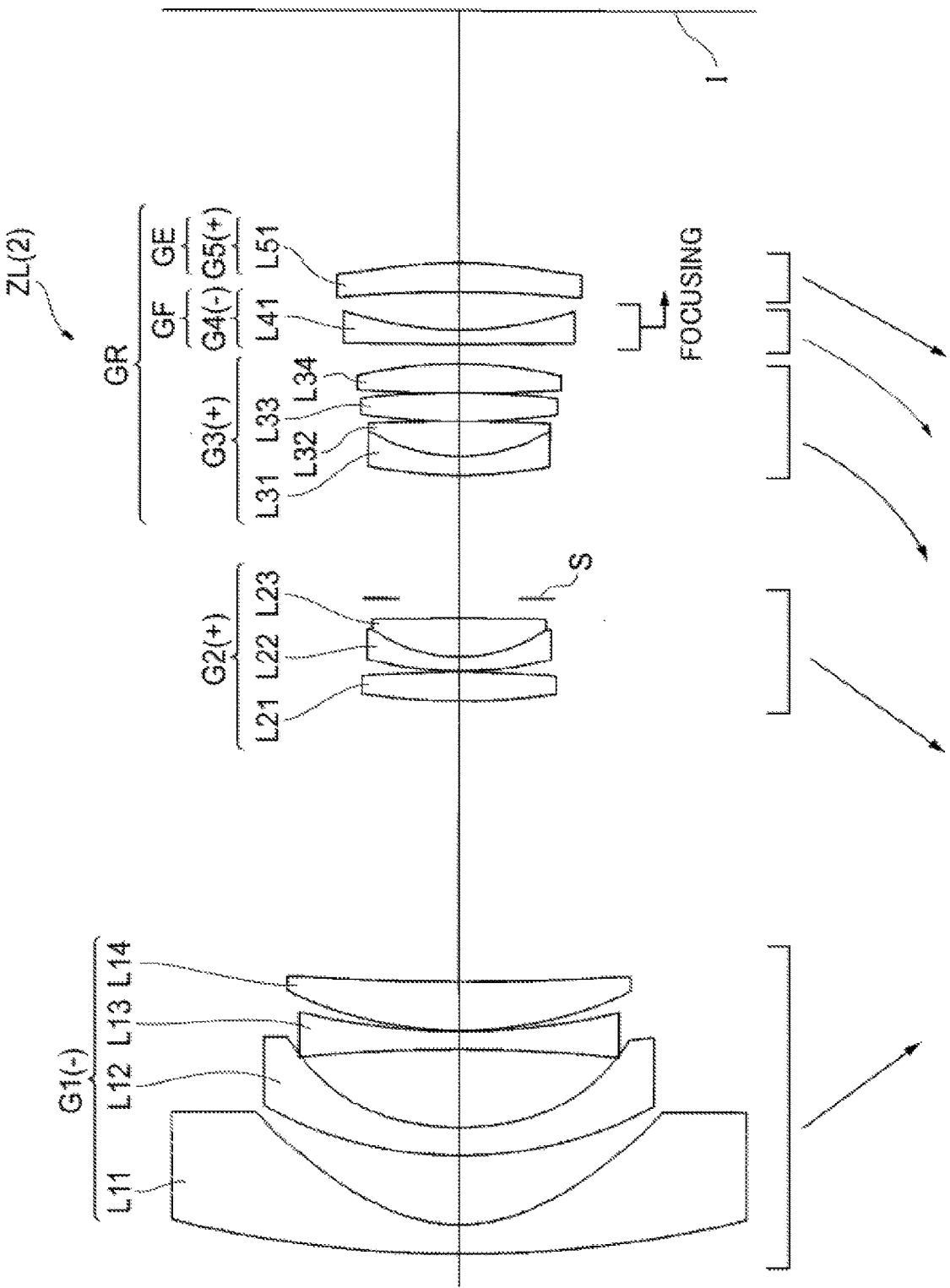
FIG. 3 is a cross-sectional view illustrating a lens configuration of a zoom lens according to Example 2 of the present embodiment.
Figure 7:
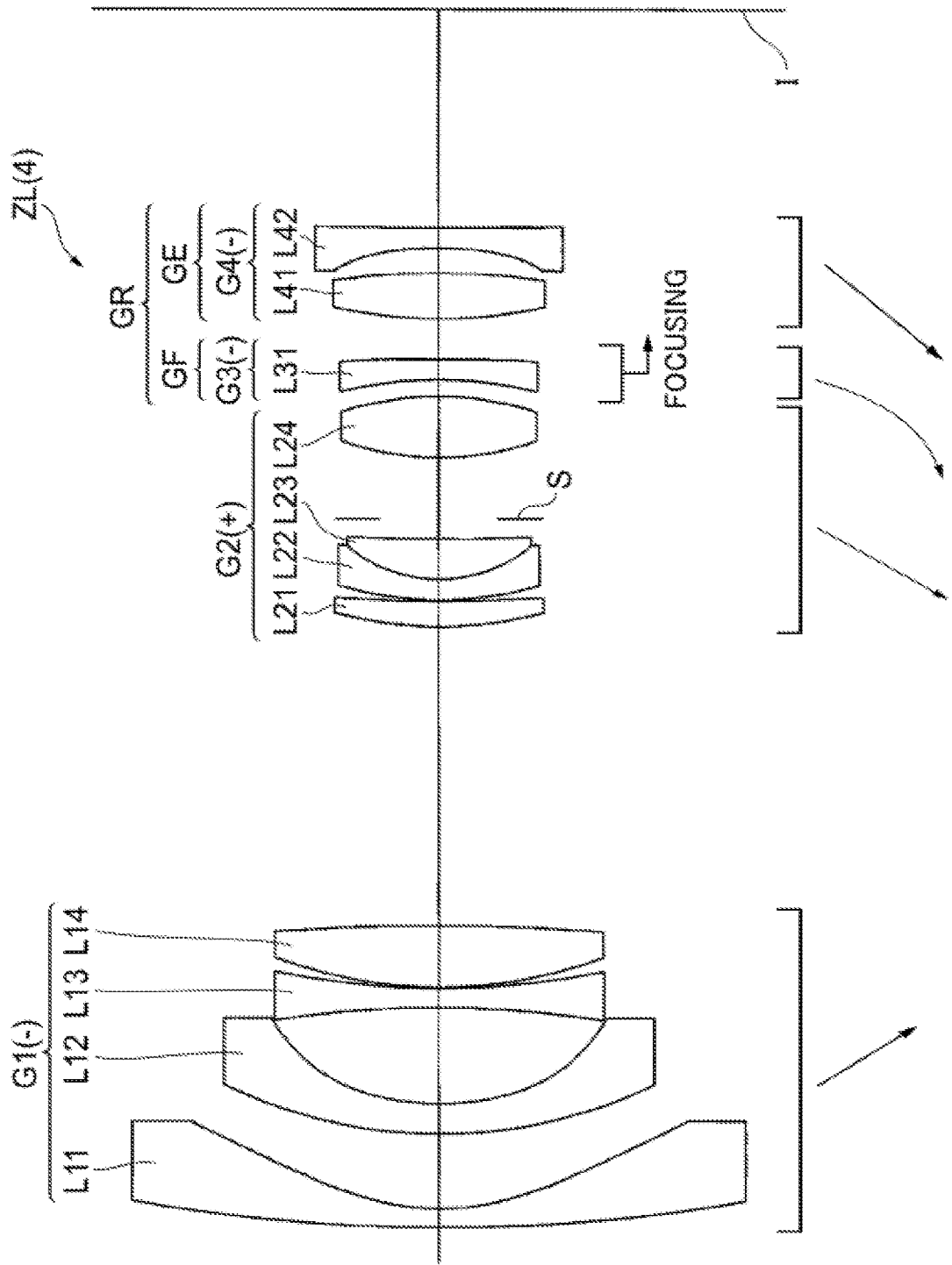
FIG. 7 is a cross-sectional view illustrating a lens configuration of a zoom lens according to Example 4 of the present embodiment.
Figure 9:
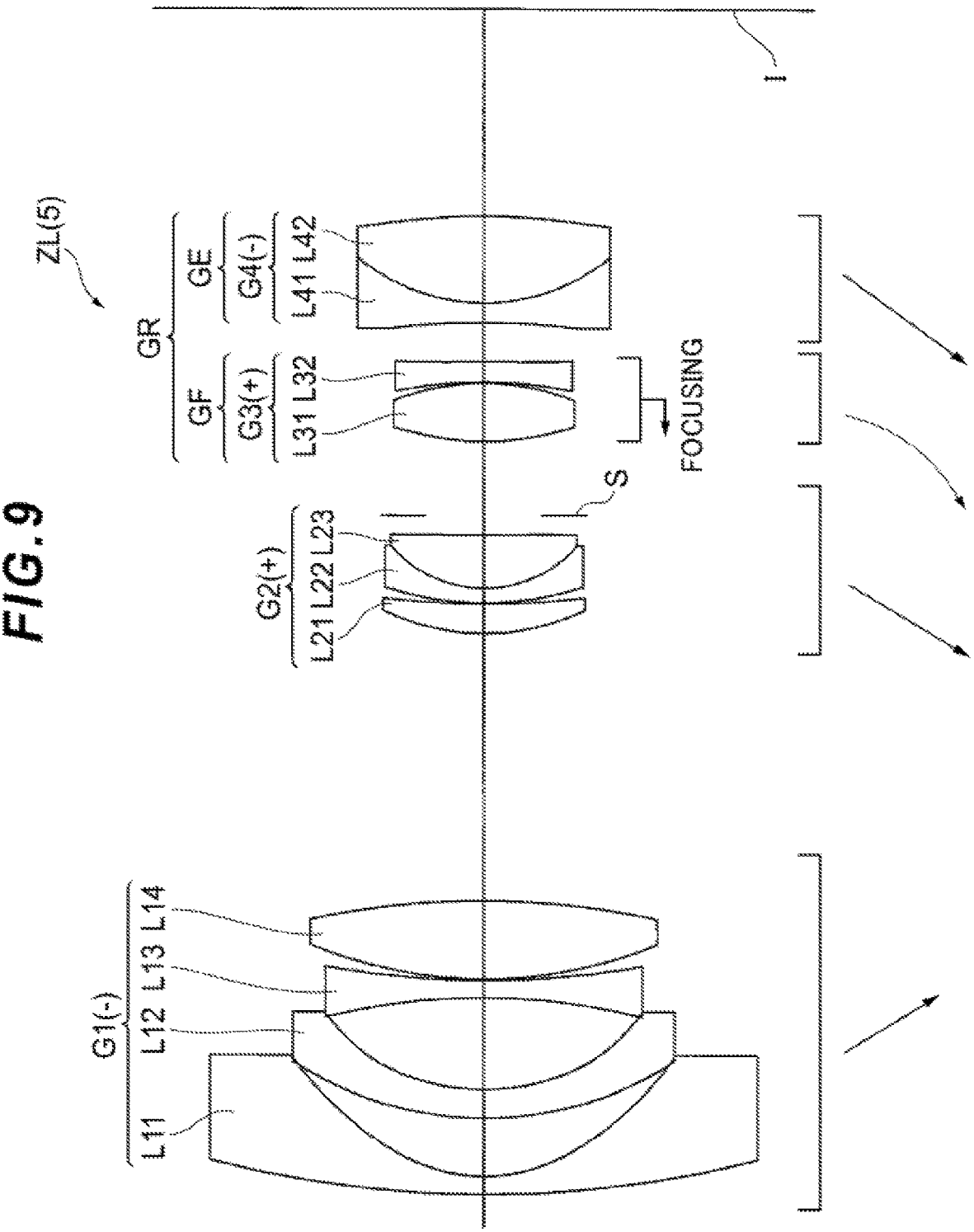
FIG. 9 is a cross-sectional view illustrating a lens configuration of a zoom lens according to Example 5 of the present embodiment.
Figure 11:
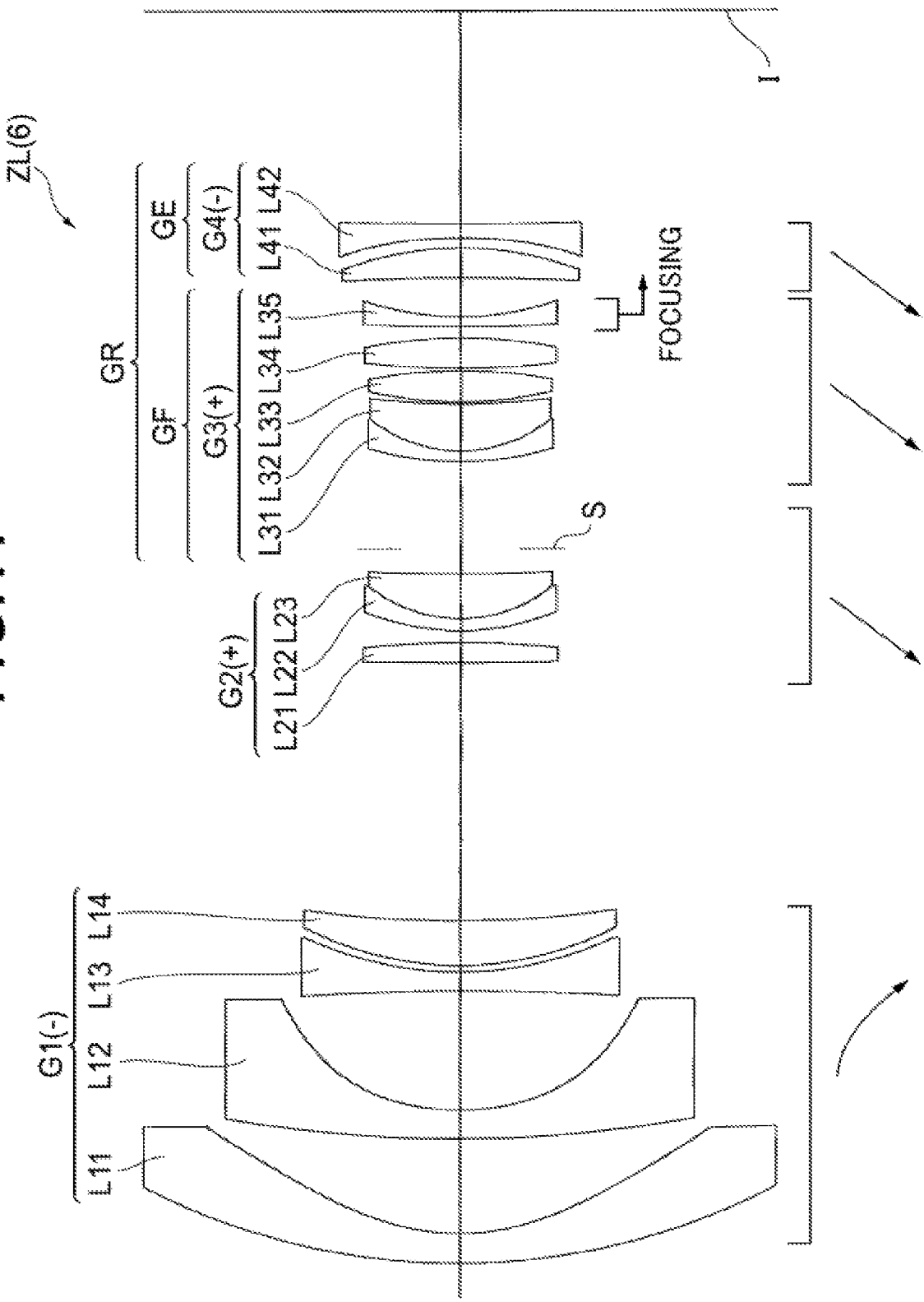
FIG. 11 is a cross-sectional view illustrating a lens configuration of a zoom lens according to Example 6 of the present embodiment.

The zoom lens ZL according to the present embodiment may be a zoom lens ZL(2) illustrated in FIG. 3, zoom lens ZL(3) illustrated in FIG. 5, a zoom lens ZL(4) illustrated in FIG. 7, a zoom lens ZL(5) illustrated in FIG. 9, or a zoom lens ZL(6) illustrated in FIG. 11.

The conditional expression (1) defines a ratio between the focal length f1 of the first lens group G1 and the focal length fE of the last lens group GE. When the zoom lens ZL having the above-described configuration satisfies the conditional expression (1), a zoom lens (zoom optical system) can be achieved to have higher optical performance with a wide angle of view in the wide angle end state and reduction in variation of aberration upon zooming.

In the zoom lens ZL, even when the zoom lens has a value below a lower limit value of the conditional expression (1) (this means that the lower limit value is a negative value and the absolute value becomes larger) or a value exceeding an upper limit value (this means that the upper limit value is a positive value and the value becomes larger), it is difficult to obtain desired optical performance. This will be described in detail below.

Since the first lens group G1 has the negative refractive power, when the last lens group GE has positive refractive power, the value of the formula "f1/fE" forming the conditional expression (1) becomes negative. When the value of the formula "f1/fE" is smaller than the lower limit value "−0.220" of the conditional expression (1) (when the absolute value is larger), the focal length of the first lens group G1 needs to be made large, a diameter of the lens on the object side in the first lens group G1 may become too large, and the whole length of the zoom lens ZL may become too long. Alternatively, the focal length of the last lens group GE needs to be made small, a coma aberration may be deteriorated, and the whole length of the zoom lens ZL may become too long.

To guarantee the effects of the conditional expression (1), the lower limit value is preferably set to be −0.210, and further preferably to be −0.200, −0.190, and −0.188.

On the other hand, when the last lens group GE has negative refractive power, the value of the formula "f1/fE" forming the conditional expression (1) becomes positive. Even when the value of the formula "f1/fE" is larger than the upper limit value "0.280" of the conditional expression (1), the focal length of the first lens group G1 needs to be made large, a diameter of the lens on the object side in the first lens group G1 may become too large, and the whole length of the zoom lens ZL may become too long. Alternatively, the focal length of the last lens group GE needs to be made small, a coma aberration may be deteriorated, and the whole length of the zoom lens ZL may become too long.

To guarantee the effects of the conditional expression (1), the upper limit value is preferably set to be 0.279, and further preferably to be 0.278, 0.250, and 0.200.

The zoom lens ZL according to the present embodiment preferably satisfies a following conditional expression (2).

$$-0.500 < f1/fF < 0.700 \quad (2)$$

where fF: a focal length of the F lens group GF.

Since the first lens group G1 has the negative refractive power, when the F lens group GF (a lens group having lenses that move upon focusing; a lens group adjacent to the object side of the last lens group GE.) has positive refractive power, the value of the formula "f1/fF" forming the conditional expression (2) becomes negative. When the value of the formula "f1/fF" is smaller than the lower limit value "−0.500" of the conditional expression (2) (when the absolute value is larger), the focal length of the first lens group G1 needs to be made large, a diameter of the lens on the object side in the first lens group G1 may become too large, and the whole length of the zoom lens ZL may become too long. Alternatively, the focal length of the focusing lens group GF needs to be made small, and a coma aberration may be deteriorated.

To guarantee the effects of the conditional expression (2), the lower limit value is preferably set to be −0.495, and further preferably to be −0.490, −0.485, −0.250, and 0.000.

On the other hand, when the focusing lens group GF has negative refractive power, the value of the formula "f1/fF" forming the conditional expression (2) becomes positive. Even when the value of the formula "f1/fF" is larger than the upper limit value "0.700" of the conditional expression (2), the focal length of the first lens group G1 needs to be made large, a diameter of the lens on the object side in the first lens group G1 may become too large, and the whole length of the zoom lens ZL may become too long. Alternatively, the focal length of the F lens group GF needs to be made small, and a coma aberration may be deteriorated.

To guarantee the effects of the conditional expression (2), the upper limit value is preferably set to be 0.650, and further preferably to be 0.630, 0.625, and 0.621.

The zoom lens ZL according to the present embodiment preferably satisfies a following conditional expression (3).

$$-1.500 < f2/fF < 0.950 \quad (3)$$

where f2: a focal length of the second lens group G2.

Since the second lens group G2 has the positive refractive power, when the F lens group GF has negative refractive power, the value of the formula "f2/fF" forming the conditional expression (3) becomes negative. When the value of the formula "f2/fF" is smaller than the lower limit value "−1.500" of the conditional expression (3) (when the absolute value is larger), the focal length of the second lens group G2 needs to be made large, and a spherical aberration may be deteriorated. Alternatively, the focal length of the F lens group GF needs to be made small, and a coma aberration may be deteriorated.

To guarantee the effects of the conditional expression (3), the lower limit value is preferably set to be −1.400, and further preferably to be −1.350, −1.305, and −1.300.

On the other hand, when the F lens group GF has positive refractive power, the value of the formula "f2/fF" forming the conditional expression (3) becomes positive. Even when the value of the formula "f2/fF" is larger than the upper limit value "0.950" of the conditional expression (3), the focal length of the second lens group G2 needs to be made large, and a spherical aberration may be deteriorated. Alternatively, the focal length of the F lens group GF needs to be made small, and a coma aberration may be deteriorated.

To guarantee the effects of the conditional expression (3), the upper limit value is preferably set to be 0.900, and further preferably to be 0.800, 0.730, 0.400, and 0.000.

The zoom lens ZL according to the present embodiment preferably satisfies a following conditional expression (4).

$$0.400 < -f1/f2 < 1.200 \quad (4)$$

The conditional expression (4) defines a condition relating to the ratio between the focal length of the first lens group G1 and the focal length of the second lens group G2. Since the first lens group G1 has the negative refractive power, the conditional expression (4) is set to a positive value as a minus value. When the value of the formula "−f1/f2" forming the conditional expression (4) is smaller than the lower limit value "0.400" of the conditional expression (4), the focal length of the first lens group G1 needs to be made small, a spherical aberration may be deteriorated when the zoom lens is in a telephoto end state, and a coma aberration may be deteriorated when the zoom lens is in a wide angle end state. Alternatively, the focal length of the second lens group G2 needs to be made large, a spherical aberration may be deteriorated.

To guarantee the effects of the conditional expression (4), the lower limit value is preferably set to be 0.420, and further preferably to be 0.440, 0.460, and 0.470.

On the other hand, When the value of the formula "−f1/f2" forming the conditional expression (4) is larger than the upper limit value "1.200" of the conditional expression (4), the focal length of the first lens group G1 needs to be made large, a diameter of the lens on the object side in the first lens group G1 may become too large, and the whole length of the zoom lens ZL may become too long. Alternatively, the focal length of the second lens group G2 needs to be made small, a spherical aberration may be deteriorated.

To guarantee the effects of the conditional expression (4), the upper limit value is preferably set to be 1.150, and further preferably to be 1.120, 1.100, and 1.070.

In the zoom lens ZL according to the present embodiment, a lens forming the first lens group G1 on a side closest to the object preferably has an aspherical surface. Thus, optical performance can be improved more accurately.

In the zoom lens ZL according to the present embodiment, a distance between the first lens group G1 and the second lens group G2 is preferably reduced upon zooming of at least a part of the lenses from a wide angle end state to a telephoto end state. Thus, desired optical performance is easily obtained.

In the zoom lens ZL according to the present embodiment, the second lens group G2 and the last lens group GE preferably have a same movement path upon zooming of at least a part of the lenses from the wide angle end state to the telephoto end state. Thus, desired optical performance can be easily obtained, and the second lens group G2 and the last lens group GE can be integrally moved for zooming, and therefore, a configuration of the movement control apparatus is simplified, which is preferable.

In the zoom lens ZL according to the present embodiment, a following conditional expression (5) is preferably satisfied.

$$1.000 < Bfw/fw < 2.000 \quad (5)$$

where Bfw: back focus of the entire zoom lens in a wide angle end state, and

Fw: a focal length of the entire zoom lens in a wide angle end state.

The conditional expression (5) defines a condition relating to a ratio between the back focus and the focal length of the entire zoom lens in the wide angle end state. When the conditional expression (5) is satisfied, it is possible to achieve a small size and excellently correct various aberrations such as coma aberration, distortion, curvature of field, and spherical aberration while a wide angle of view is secured.

To guarantee the effects of the conditional expression (5), the upper limit value is preferably set to be 1.900, and further preferably to be 1.805, 1.700, and 1.650.

To guarantee the effects of the conditional expression (5), the lower limit value is preferably set to be 1.100, and further preferably to be 1.200, 1.300, and 1.400.

In the zoom lens ZL according to the present embodiment, a following conditional expression (6) is preferably satisfied.

$$0.100 < -f1/f2Rw < 1.600 \quad (6)$$

where f2Rw: a composite focal length of the second lens group G2 and the rear lens group GR in a wide angle end state.

The conditional expression (6) defines a condition relating to a ratio between the focal length of the first lens group G1 and the composite focal length of the second lens group G2 and the rear lens group GR. When the conditional expression (6) is satisfied, various aberrations including a coma aberration in the wide angle end state can be effectively corrected while a wide angle of view is secured, and fluctuation of various aberrations including a spherical aberration upon zooming can be prevented.

When the value of the zoom lens exceeds the upper limit value of the conditional expression (6), composite refractive power of the lens group behind the first lens group G1 becomes strong in the wide angle end state, and various aberrations including a coma aberration in the wide angle end state is difficult to be effectively corrected.

When the value of the zoom lens falls below the lower limit value of the conditional expression (6), refractive power of the first lens group G1 becomes strong, fluctuation of various aberrations including a spherical aberration is difficult to be prevented upon zooming from the wide angle end state to the telephoto end state.

To guarantee the effects of the conditional expression (6), the upper limit value is preferably set to be 1.400, and further preferably to be 1.200, 1.100, 1.000, and 0.900.

To guarantee the effects of the conditional expression (6), the lower limit value is preferably set to be 0.200, and further preferably to be 0.300, 0.400, and 0.500.

In the zoom lens ZL according to the present embodiment, a following conditional expression (7) is preferably satisfied.

$$-0.500 < f1/fFEw < 1.000 \quad (7)$$

where fFEw: a composite focal length of the F lens group GF and the last lens group GE in a wide angle end state.

The conditional expression (7) defines a condition relating to a ratio between the focal length of the first lens group G1 and the composite focal length of the F lens group GF and the last lens group GE. When the conditional expression (7) is satisfied, various aberrations such as a coma aberration can be excellently corrected while a wide angle of view is secured. Further, preferably, the whole length of the zoom lens ZL does not become too long.

To guarantee the effects of the conditional expression (7), the upper limit value is preferably set to be 0.900, and further preferably to be 0.850, 0.800, and 0.750.

To guarantee the effects of the conditional expression (7), the lower limit value is preferably set to be −0.350, and further preferably to be −0.200, −0.100, and 0.000.

In the zoom lens ZL according to the present embodiment, a following conditional expression (8) is preferably satisfied.

$$-1.000 < -f1/fRw < 0.600 \quad (8)$$

where fRw: a focal length of the rear lens group GR in a wide angle end state.

The conditional expression (8) defines a condition relating to a ratio between the focal length of the first lens group G1 and the focal length of the rear lens group GR. When the conditional expression (8) is satisfied, various aberrations such as coma aberration, distortion, and curvature of field can be excellently corrected while a wide angle of view is secured, and fluctuation of various aberrations including a spherical aberration upon zooming can be prevented.

To guarantee the effects of the conditional expression (8), the upper limit value is preferably set to be 0.500, and further preferably to be 0.450, 0.420, and 0.400.

To guarantee the effects of the conditional expression (8), the lower limit value is preferably set to be −0.900, and further preferably to be −0.800, −0.720, −0.300, and 0.000.

In the zoom lens ZL according to the present embodiment, a following conditional expression (9) is preferably satisfied.

$$40.00° < \omega w < 80.00° \qquad (9)$$

where ωw: a half angle of view in a wide angle end state.

The conditional expression (9) is a condition that defines an optimum value of the angle of view in the wide angle end state. When the conditional expression (9) is satisfied, various aberrations such as coma aberration, distortion, and curvature of field can be excellently corrected while a wide angle of view is secured.

To guarantee the effects of the conditional expression (9), the upper limit value is preferably set to be 75.00°, and further preferably to be 70.00°, 65.00°, and 62.00°.

To guarantee the effects of the conditional expression (9), the lower limit value is preferably set to be 43.50°, and further preferably to be 46.00°, 48.00°, 50.00°, 52.00°, and 54.00°.

In the zoom lens ZL according to the present embodiment, the rear lens group GR preferably includes a third lens group G3 having positive refractive power, on a side closest to the object. Thus, optical performance can be improved more accurately.

According to the zoom lens ZL of the present embodiment having the above-described configuration, it is possible to achieve higher optical performance with a wide angle of view in the wide angle end state and reduction in variation of aberration upon zooming.

Figure 13:
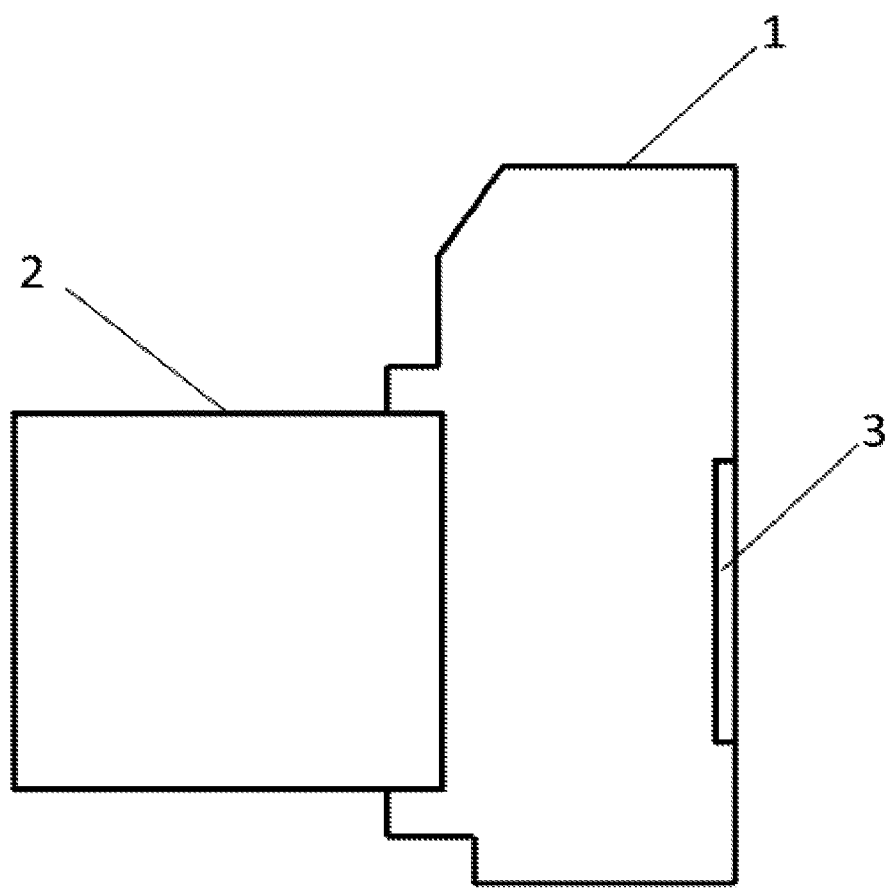
FIG. 13 is a schematic view illustrating a configuration of a camera including the zoom lens according to the present embodiment.

The optical apparatus of the present embodiment includes the zoom lens ZL having the above-described configuration. As a specific example, a camera (optical apparatus) including the zoom lens ZL will be described with reference to FIG. 13. As illustrated in FIG. 13, such a camera 1 is a digital camera including a zoom lens ZL as a photographing lens 2 according to the embodiment. In the camera 1, light from an object (subject; not illustrated) is collected by the photographing lens 2, and reaches an image sensor 3. Thus, the image sensor 3 takes an image using the light from the subject, and the image is recorded in a memory (not illustrated) as a subject image. In this way, a photographer can capture an image of the subject with the camera 1. The camera may be a mirrorless camera or a single-lens reflex camera having a quick return mirror. Although not illustrated, the camera 1 further includes an auxiliary light emitting unit that emits auxiliary light when a subject is dark, a function button used for setting various conditions of the digital camera and the like.

Herein, a compact type camera is illustrated as an example in which the camera 1 and the zoom lens ZL are integrally formed. However, the optical apparatus may also be a single-lens reflex camera in which a lens barrel including the zoom lens ZL and a camera body are detachable.

According to the camera 1 of the present embodiment having the configuration described above, the above-described zoom lens ZL serving as the photographing lens is mounted, and thus a camera with higher optical performance can be achieved in which an angle of view is wide in the wide angle end state and variation of aberration is reduced upon zooming.

Subsequently, a method for manufacturing the above-described zoom lens ZL will be described with reference to FIG. 14. First, a first lens group G1 having negative refractive power, a second lens group G2 having positive refractive power, and a rear lens group GR are disposed within a lens barrel in order from an object (step ST1). The first lens group G1, the second lens group G2, and the rear lens group GR are configured in such a manner that, upon zooming, the respective lens groups moves and a distance between the lens groups adjacent to each other changes (step ST2). Further, at least a part of F lens group GF is configured to move upon focusing (step ST3). Then, the respective lenses are disposed within a lens barrel to satisfy the conditional expression (1) described above (step ST4).

According to the manufacturing method of the present embodiment as described above, it is possible to manufacture the zoom lens ZL having good optical performance with a wide angle of view in the wide angle end state and reduction in variation of aberration upon zooming.

EXAMPLE

Zoom lenses ZL according to Examples of the present embodiment will be described with reference to the drawings. FIGS. 1, 3, 5, 7, 9, and 11 are cross-sectional views illustrating configurations of zoom lenses ZL {ZL(1) to ZL(6)} according to Examples 1 to 6, respectively. Each of the cross-sectional views illustrates positions of respective lens groups in a wide angle end state (W). In these drawings, arrows illustrated in the middle part indicate moving directions of the respective lens groups upon zooming (zooming operation) from the wide angle end state to the telephoto end state. In addition, an F lens group GF indicated as a focus by an arrow represents a lens group used entirely or partially for focusing, and an arrow indicates a moving direction of the F lens group GF at this time. Note that since the F lens group GF is entirely or partially used for focusing in this way, the F lens group GF is also referred to as a focusing lens group GF.

In these drawings, each of the lens groups is represented by a combination of a symbol G and a number, and each of the lenses is represented by a combination of a symbol L and a number. In this case, in order to prevent complications due to an increase in the types and numbers of symbols and numbers, the lens groups are represented using combinations of symbols and numbers independently for each Example. For this reason, although the combination of the same symbol and number is used for every Example, this indicates a configuration for every Example and does not means the same configuration.

Tables 1 to 6 are shown below, but are tables indicating data of Examples 1 to 6.

In "Lens Data" in tables, a surface number represents an order of an optical surface from the object side in a traveling direction of a light beam, R represents a radius of curvature of each optical surface (a surface where the center of curvature is located on the image side is a positive value), D represents a surface distance which is a distance between each optical surface and the next optical surface on the optical axis, vd represents Abbe number of the material of the optical member based on the d-line, and nd represents a refractive index of a material of an optical member with respect to the d-line (wavelength 587.6 nm). Furthermore, the surface number represents the order of the lens surface from the object side in the traveling direction of the light beam. The radius of curvature "a" represents a plane or an aperture, and (stop S) represents the aperture stop S. The refractive index of air "nd=1.00000" is omitted. When the lens surface is an aspherical surface, the surface number is added with a mark * and the column of radius of curvature R indicates a paraxial radius of curvature.

In "Aspherical Surface Data" in tables, the shape of the aspherical surface indicated in "Lens Data" is represented by the following formula (a). X(y) represents a distance (zag amount) between the tangent plane at the vertex of the aspherical surface and a position on the aspherical surface at a height y in the optical axis direction, R represents a radius of curvature (paraxial radius of curvature) of a reference spherical surface, κ represents a conical coefficient, and Ai represents an i-th aspherical coefficient. "E-n" represents "×10$^{-n}$", for example, is 1.234E−05=1.234×10$^{-5}$. A secondary aspherical coefficient A2 is 0, and thus is omitted.

$$X(y)=(y^2/R)/\{1+(1-\kappa \times y^2/R^2)^{1/2}\}+A4 \times y^4+A6 \times y^6+A8 \times y^8+A10 \times y^{10}+A12 \times y^{12} \quad (a)$$

"General Data" in tables shows the data of the zoom lens, where f represents a focal length of the entire zoom lens, FNo represents an F number, ω represents a half angle of view (unit: °), and Y represents an image height at a wide angle end (wide), a middle position (middle), and a telephoto end (tele).

"Variable Distance Data" in tables indicates a distance to the next lens surface in the surface number denoted by symbols D1, D2, D3, and D4 as a distance to the next lens surface in the Table showing "Lens Data". Bf represents a distance (back focus) from a lens last surface to an image surface I on the optical axis upon focusing on infinity. A whole length is a whole length of the zoom lens, and represents is a distance obtained by adding Bf to a distance the lens forefront surface to the lens last surface on the optical axis. The variable distance data indicate values at a wide angle end (wide), a middle position (middle), and a telephoto end (tele).

A Table of "Lens Group Data" indicates focal lengths of respective lens groups. In Table, f1 to f5 indicate focal lengths of first to fifth lens groups.

"Conditional Expression Corresponding Value" in tables indicates values corresponding to the conditional expressions (1) to (9) described above.

In all the data values, "mm" is generally used below as the unit of the focal length f, the radius of curvature R, the surface distance D, other lengths and the like, unless otherwise specified, but another unit can be used without being limited to the unit "mm" because an equivalent optical performance is acquired even when the optical system is proportionally expanded or reduced.

The description on the tables is common for all Examples, hence a duplicate description in respective Examples below will not be presented.

Example 1

Example 1 will be described with reference to FIGS. 1 and 2 and Table 1. FIG. 1 is a diagram illustrating a lens configuration of the zoom lens ZL(1) according to Example 1 of the present embodiment. The zoom lens ZL(1) includes a first lens group G1 having negative refractive power, a second lens group G2 having positive refractive power, a third lens group G3 having positive refractive power, a fourth lens group G4 having negative refractive power, and a fifth lens group G5 having negative refractive power which are disposed in order from an object. A symbol (+) or (−) attached to each of the lens groups shows refractive power of each of the lens groups (the same applies to the following Examples). In this example, the third lens group G3, the fourth lens group G4, and the fifth lens group G5 form a rear lens group GR. In the rear lens group GR, in order from a side closest to an image, the fifth lens group G5 forms a last lens group GE, the fourth lens group G4 forms an F lens group GF, and the fourth lens group G4 (F lens group GF) forms a focusing lens group.

An aperture stop S, for determining brightness, is disposed on an image side of the second lens group G2. The aperture stop S is disposed independently of the second lens group G2, but moves in an optical axis direction together the second lens group G2. On an image side of the fifth lens group G5, an image surface I of a solid-state image sensor such as a CCD is located.

Upon zooming, the first to fifth lens groups G1 to G5 move in optical axis directions as indicated by arrows in FIG. 1, respectively. Distances between the respective lens groups caused by the movement, that is, distances to the next lens surface D1, D2, D3, and D4 shown in "Lens Data" of Table 1 are variable, and values of the distances are shown in a column of "Variable Distance Data".

The first lens group G1 consists of a negative meniscus lens L11 having a concave surface facing the image side, a negative meniscus lens L12 having a concave surface facing the image side, a biconcave negative lens L13, and a positive meniscus lens L14 having a concave surface facing the image side, which are disposed in order from an object. An image-side surface of the negative meniscus lens L11 and an image-side surface of the negative meniscus lens L12 are aspherical surfaces, respectively.

The second lens group G2 consists of a positive meniscus lens L21 having a concave surface facing the image side and a cemented lens of a negative meniscus lens L22 having a concave surface facing the image side and a positive meniscus lens L23 having a concave surface facing the image side, which are disposed in order from an object.

The third lens group G3 consists of a cemented lens of a negative meniscus lens L31 having a concave surface facing the image side and a positive meniscus lens L32 having a concave surface facing the image side, a biconvex positive lens L33, and a biconvex positive lens L34, which are disposed in order from an object. An image-side surface of the positive meniscus lens L32 is an aspherical surface.

The fourth lens group G4 consists of a negative meniscus lens L41 having a concave surface facing an image side. The fifth lens group G5 consists of a positive meniscus lens L51 having a convex surface facing an image side and a biconcave negative lens L52. The fourth lens group G4, the fifth lens group G5, and the third lens group G3 are combined to form a rear lens group GR. An object-side surface of the negative lens L52 is an aspherical surface.

In the zoom lens ZL(1), focusing from infinity (long-distance object) to a short-distance object is performed when the fourth lens group G4 is moved in a direction of the image surface.

As indicated by arrows in FIG. 1, the zoom lens ZL(1) according to Example 1 has a configuration in which the first lens group G1 is moved toward the image side and the second to fifth lens groups G2 to G5 are moved toward the object side upon zooming from the wide angle end state to the telephoto end state. The aperture stop S moves integrally with the second lens group G2 upon zooming. Upon zooming from the wide angle end state to the telephoto end state in this way, a distance between the first lens group G1 and the second lens group G2 is reduced. In addition, the second lens group G2 and the fifth lens group G5 have the same movement path upon zooming.

The following Table 1 lists values of data of the optical system according to Example 1.

TABLE 1

[Lens Data]

| Surface Number | R | D | vd | nd |
|---|---|---|---|---|
| 1 | 190.7535 | 3.000 | 53.32 | 1.69370 |
| *2 | 18.8098 | 9.500 | | |
| 3 | 51.5630 | 2.900 | 53.32 | 1.69370 |
| *4 | 22.7020 | 9.700 | | |
| 5 | −71.0651 | 1.900 | 82.57 | 1.49782 |
| 6 | 44.4835 | 0.100 | | |
| 7 | 32.6080 | 4.500 | 35.73 | 1.90265 |
| 8 | 296.5863 | D1 | | |
| 9 | 63.0604 | 2.000 | 67.00 | 1.59349 |
| 10 | 499.8755 | 0.100 | | |
| 11 | 24.0057 | 1.200 | 40.66 | 1.88300 |
| 12 | 13.3470 | 4.500 | 56.00 | 1.56883 |
| 13 | 333.9818 | 2.500 | | |
| 14 | ∞ | D2 | (Aperture Stop S) | |
| 15 | 36.3784 | 1.100 | 46.59 | 1.81600 |
| 16 | 14.0097 | 4.710 | 64.08 | 1.51612 |
| *17 | 61.0448 | 0.200 | | |
| 18 | 27.9719 | 3.150 | 82.57 | 1.49782 |
| 19 | −75.3921 | 0.250 | | |
| 20 | 91.9654 | 3.050 | 82.57 | 1.49782 |
| 21 | −29.3923 | D3 | | |
| 22 | 72.0930 | 1.000 | 45.31 | 1.79500 |
| 23 | 20.9929 | D4 | | |
| 24 | −538.2301 | 4.800 | 82.57 | 1.49782 |
| 25 | −20.1257 | 0.100 | | |
| *26 | −38.9341 | 1.400 | 46.75 | 1.76546 |
| 27 | 154.8320 | Bf | | |

[Aspherical Surface Data]

| Aspherical Surface | κ | A4 | A6 |
|---|---|---|---|
| 2nd Surface | −1.00000 | −1.33157E−05 | −3.07345E−08 |
| 4th Surface | −1.00000 | 3.67009E−05 | 1.37031E−07 |
| 17th Surface | 0.00000 | 1.75905E−05 | −6.64635E−08 |
| 26th Surface | −1.00000 | −2.67902E−05 | −3.34364E−08 |

| Aspherical Surface | A8 | A10 | A12 |
|---|---|---|---|
| 2nd Surface | 6.91260E−11 | −3.76684E−14 | — |
| 4th Surface | −5.20756E−10 | 3.14884E−12 | −5.61530E−15 |
| 17th Surface | 2.26551E−10 | −4.40763E−12 | — |
| 26th Surface | −1.13765E−10 | −1.88017E−13 | — |

[General Data]

f = 14.420~20.000~29.101
FNO = 4.00~4.00~4.00
ω = 57.68°~46.85°~35.27°
Y = 21.70~21.70~21.70

[Variable Distance Data]

| | wide | middle | tele |
|---|---|---|---|
| D1 | 28.616 | 12.942 | 2.214 |
| D2 | 7.483 | 6.371 | 3.521 |
| D3 | 1.579 | 2.261 | 2.007 |
| D4 | 5.766 | 6.196 | 9.300 |
| Bf | 21.360 | 26.809 | 36.297 |
| Entire Length | 126.464 | 116.239 | 114.999 |

TABLE 1-continued

[Lens Group Data]

| f1 | −23.297 |
|---|---|
| f2 | 48.882 |
| f3 | 26.663 |
| f4 | −37.580 |
| f5 | −1392.883 |

[Conditional Expression Corresponding Value]

Conditional Expression(1) f1/fE = 0.017
Conditional Expression(2) f1/fF = 0.620
Conditional Expression(3) f2/fF = −1.301
Conditional Expression(4) −f1/f2 = 0.477
Conditional Expression(5) Bfw/fw = 1.481
Conditional Expression(6) −f1/f2Rw = 0.742
Conditional Expression(7) f1/fFEw = 0.643
Conditional Expression(8) −f1/fRw = 0.353
Conditional Expression(9) ωw = 57.68°

As shown in Table of "Conditional Expression Corresponding Value" described above, the zoom lens ZL(1) according to Example 1 illustrated in FIG. 1 satisfies the conditional expressions (1) to (9) described above.

Figure 2A:
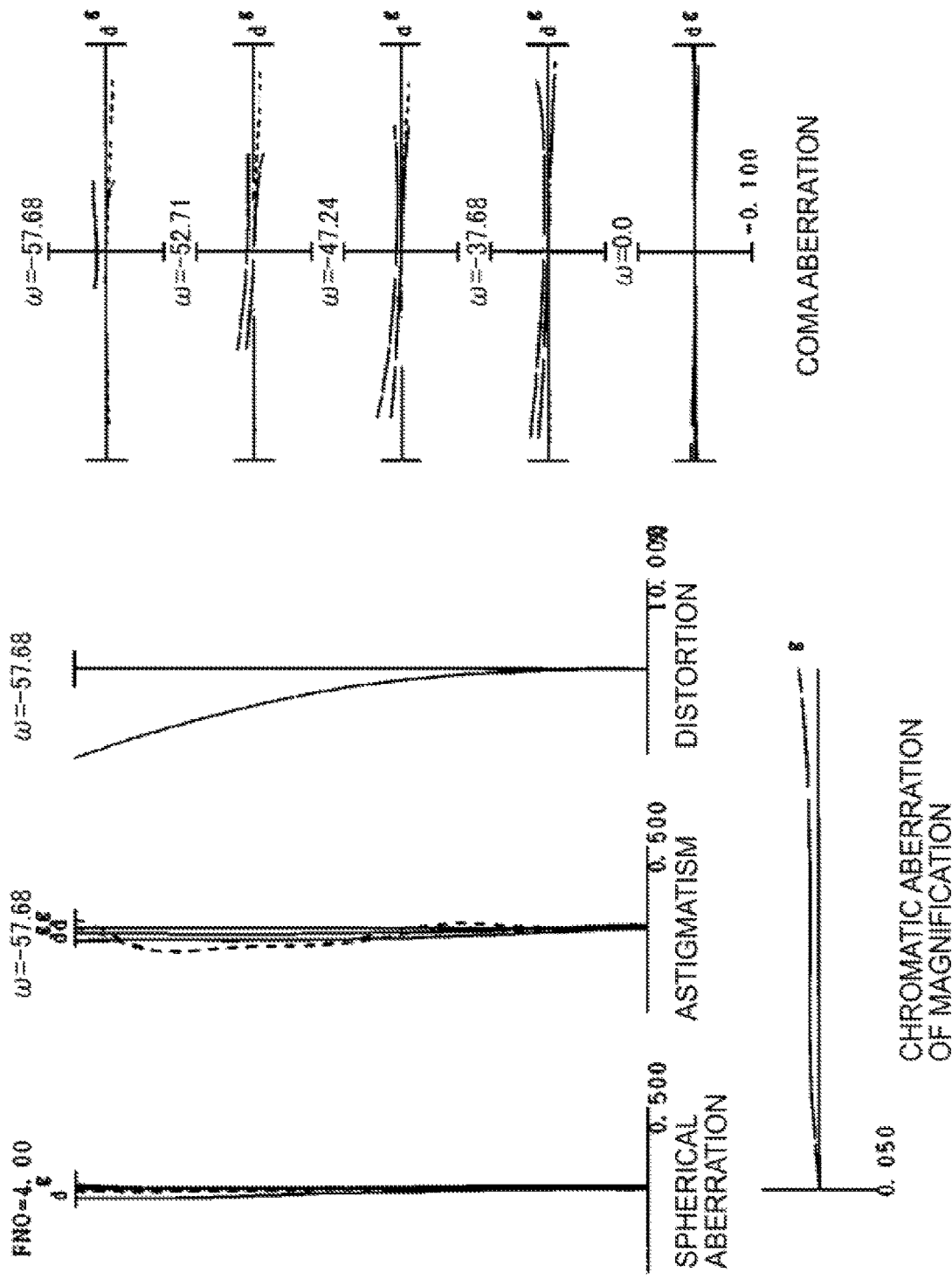

FIGS. 2A, 2B, and 2C are various aberration graphs (a spherical aberration graph, an astigmatism graph, a distortion graph, a coma aberration graph, and a chromatic aberration-of-magnification graph) of the zoom lens ZL(1) according to Example 1 in a wide angle end state, an intermediate focal length state, and a telephoto end state upon focusing on infinity. As can be seen from the various aberration graphs, the zoom lens ZL(1) according to Example 1 corrects various aberrations well from the wide angle end state to the telephoto end state, and has excellent imaging performance. Note that the distortion can be corrected by image processing after imaging, and optical correction is not required.

In FIGS. 2A, 2B, and 2C, FNO represents an F number, and ω represents a half angle of view (unit: °). Symbols d, g, C, and F represent aberrations on a d-line (wavelength 587.6 nm), a g-line (wavelength 435.8 nm), a C-line (wavelength 656.3 nm), and an F-line (wavelength 486.1 nm), respectively. In the spherical aberration graph, the astigmatism graph, and the coma aberration graph, a solid line indicates a sagittal image surface aberration, and a broken line indicates a meridional image surface aberration. A duplicate description will not be described below as in all aberration graphs of the following Examples.

Example 2

Example 2 will be described with reference to FIGS. 3 and 4 and Table 2. FIG. 3 is a diagram illustrating a lens configuration of the zoom lens ZL(2) according to Example 2 of the present embodiment. The zoom lens ZL(2) includes a first lens group G1 having negative refractive power, a second lens group G2 having positive refractive power, a third lens group G3 having positive refractive power, a fourth lens group G4 having negative refractive power, and a fifth lens group G5 having positive refractive power which are disposed in order from an object. In this example, the third lens group G3, the fourth lens group G4, and the fifth lens group G5 form a rear lens group GR. In the rear lens group GR, in order from a side closest to an image, the fifth lens group G5 forms a last lens group GE, the fourth lens group G4 forms an F lens group GF, and the fourth lens group G4 (F lens group GF) forms a focusing lens group.

An aperture stop S, for determining brightness, is disposed on an image side of the second lens group G2. The aperture stop S is disposed independently of the second lens group G2, but moves in an optical axis direction together with the second lens group G2. On an image side of the fifth lens group G5, an image surface I is located.

Upon zooming, the first to fifth lens groups G1 to G5 move in optical axis directions as indicated by arrows in FIG. 3, respectively. Distances between the respective lens groups caused by the movement, that is, distances to the next lens surface D1, D2, D3, and D4 shown in "Lens Data" of Table 2 are variable, and values of the distances are shown in a column of "Variable Distance Data".

The first lens group G1 consists of a negative meniscus lens L11 having a concave surface facing the image side, a negative meniscus lens L12 having a concave surface facing the image side, a biconcave negative lens L13, and a positive meniscus lens L14 having a concave surface facing the image side, which are disposed in order from an object. An image-side surface of the negative meniscus lens L11 and an image-side surface of the negative meniscus lens L12 are aspherical surfaces, respectively.

The second lens group G2 consists of a biconvex positive lens L21 and a cemented lens of a negative meniscus lens L22 having a concave surface facing the image side and a biconvex positive lens L23, which are disposed in order from an object.

The third lens group G3 consists of a cemented lens of a negative meniscus lens L31 having a concave surface facing the image side and a biconvex positive lens L32, a biconvex positive lens L33, and a biconvex positive lens L34, which are disposed in order from an object. An image-side surface of the biconvex positive lens L33 is an aspherical surface.

The fourth lens group G4 consists of a negative meniscus lens L41 having a concave surface facing an image side. The fifth lens group G5 consists of a positive meniscus lens L51 having a convex surface facing an image side. The fourth lens group G4, the fifth lens group G5, and the third lens group G3 are combined to form a rear lens group GR. An image-side surface of the positive meniscus lens L51 is an aspherical surface.

In the zoom lens ZL(2), focusing from infinity (long-distance object) to a short-distance object is performed when the fourth lens group G4 is moved in a direction of the image surface.

As indicated by arrows in FIG. 3, the zoom lens ZL(2) according to Example 2 has a configuration in which the first lens group G1 is moved toward the image side and the second to fifth lens groups G2 to G5 are moved toward the object side upon zooming from the wide angle end state to the telephoto end state. The aperture stop S moves integrally with the second lens group G2 upon zooming. Upon zooming from the wide angle end state to the telephoto end state in this way, a distance between the first lens group G1 and the second lens group G2 is reduced. In addition, the second lens group G2 and the fifth lens group G5 have the same movement path upon zooming.

The following Table 2 lists values of data of the optical system according to Example 2.

TABLE 2

[Lens Data]

| Surface Number | R | D | vd | nd |
|---|---|---|---|---|
| 1 | 105.12050 | 3.000 | 53.31 | 1.69370 |
| *2 | 14.14270 | 7.068 | | |
| 3 | 35.00310 | 2.955 | 46.77 | 1.76546 |
| *4 | 23.32410 | 7.971 | | |

TABLE 2-continued

| 5 | −137.48910 | 1.847 | 46.50 | 1.80420 |
|---|---|---|---|---|
| 6 | 56.85210 | 0.100 | | |
| 7 | 33.72800 | 5.000 | 29.13 | 2.00100 |
| 8 | 203.45350 | D1 | | |
| 9 | 54.10780 | 3.000 | 54.24 | 1.53768 |
| 10 | −96.44030 | 0.100 | | |
| 11 | 32.33530 | 1.500 | 44.85 | 1.74397 |
| 12 | 13.11780 | 4.000 | 58.10 | 1.51225 |
| 13 | −480.99880 | 2.000 | | |
| 14 | ∞ | D2 | (Aperture Stop S) | |
| 15 | 38.43600 | 2.000 | 40.66 | 1.88300 |
| 16 | 15.38660 | 3.500 | 68.87 | 1.49003 |
| 17 | −200.15130 | 0.000 | | |
| 18 | 52.69560 | 3.000 | 71.68 | 1.55332 |
| *19 | −98.99660 | 0.000 | | |
| 20 | 165.51060 | 3.000 | 82.57 | 1.49782 |
| 21 | −36.89330 | D3 | | |
| 22 | 620.18560 | 1.500 | 40.66 | 1.88300 |
| 23 | 30.80350 | D4 | | |
| 24 | −108.17020 | 3.000 | 70.35 | 1.48743 |
| *25 | −36.57970 | Bf | | |

[Aspherical Surface Data]

| Aspherical Surface | κ | A4 | A6 |
|---|---|---|---|
| 2nd Surface | −1.00000 | −1.19107E−05 | 1.69580E−08 |
| 4th Surface | −1.00000 | 3.86364E−05 | 4.04048E−08 |
| 19th Surface | 0.00000 | −1.57314E−05 | −5.85331E−08 |
| 25th Surface | −1.00000 | 2.59736E−05 | 1.09567E−08 |

| Aspherical Surface | A8 | A10 | A12 |
|---|---|---|---|
| 2nd Surface | −1.21696E−10 | 2.63314E−13 | — |
| 4th Surface | 4.14632E−11 | 1.08673E−12 | −3.50920E−15 |
| 19th Surface | −1.51543E−10 | −1.90250E−12 | — |
| 25th Surface | 4.63419E−10 | −1.35618E−12 | — |

[General Data]

f = 14.430~20.010~29.110
FNO = 4.10~4.10~4.10
ω = 57.34°~47.36°~35.31°
Y = 21.70~21.70~21.70

[Variable Distance Data]

| | wide | middle | tele |
|---|---|---|---|
| D1 | 28.929 | 13.211 | 1.599 |
| D2 | 12.659 | 11.234 | 8.667 |
| D3 | 2.011 | 3.965 | 6.046 |
| D4 | 3.914 | 3.385 | 3.871 |
| Bf | 25.978 | 31.499 | 40.270 |
| Entire Length | 128.032 | 117.835 | 114.994 |

[Lens Group Data]

| f1 | −20.907 |
|---|---|
| f2 | 45.126 |
| f3 | 31.818 |
| f4 | −36.752 |
| f5 | 111.855 |

[Conditional Expression Corresponding Value]

Conditional Expression(1) f1/fE = −0.187
Conditional Expression(2) f1/fF = 0.569
Conditional Expression(3) f2/fF = −1.228
Conditional Expression(4) −f1/f2 = 0.463
Conditional Expression(5) Bfw/fw = 1.800
Conditional Expression(6) −f1/f2Rw = 0.624
Conditional Expression(7) f1/fFEw = 0.347
Conditional Expression(8) −f1/fRw = 0.328
Conditional Expression(9) ωw = 57.34°

As shown in Table of "Conditional Expression Corresponding Value" described above, the zoom lens ZL(2)

according to Example 2 illustrated in FIG. 3 satisfies the conditional expressions (1) to (9) described above.

FIGS. 4A, 4B, and 4C are various aberration graphs (a spherical aberration graph, an astigmatism graph, a distortion graph, a coma aberration graph, and a chromatic aberration-of-magnification graph) of the zoom lens ZL(2) according to Example 2 in a wide angle end state, an intermediate focal length state, and a telephoto end state upon focusing on infinity. As can be seen from the various aberration graphs, the zoom lens ZL(2) according to Example 2 corrects various aberrations well from the wide angle end state to the telephoto end state, and has excellent imaging performance.

Example 3

Example 3 will be described with reference to FIGS. 5 and 6 and Table 3. FIG. 5 is a diagram illustrating a lens configuration of the zoom lens ZL(3) according to Example 3 of the present embodiment. The zoom lens ZL(3) includes a first lens group G1 having negative refractive power, a second lens group G2 having positive refractive power, a third lens group G3 having positive refractive power, a fourth lens group G4 having negative refractive power, and a fifth lens group G5 having positive refractive power which are disposed in order from an object. In this example, the third lens group G3, the fourth lens group G4, and the fifth lens group G5 form a rear lens group GR. In the rear lens group GR, in order from a side closest to an image, the fifth lens group G5 forms a last lens group GE, the fourth lens group G4 forms an F lens group GF, and the fourth lens group G4 (F lens group GF) forms a focusing lens group.

An aperture stop S, for determining brightness, is disposed on an image side of the second lens group G2. The aperture stop S is disposed independently of the second lens group G2, but moves in an optical axis direction together the second lens group G2. On an image side of the fifth lens group G5, an image surface I is located.

Upon zooming, the first to fifth lens groups G1 to G5 move in optical axis directions as indicated by arrows in FIG. 5, respectively. Distances between the respective lens groups caused by the movement, that is, distances to the next lens surface D1, D2, D3, and D4 shown in "Lens Data" of Table 3 are variable, and values of the distances are shown in a column of "Variable Distance Data".

The first lens group G1 consists of a negative meniscus lens L11 having a concave surface facing the image side, a negative meniscus lens L12 having a concave surface facing the image side, a biconcave negative lens L13, and a biconvex positive lens L14, which are disposed in order from an object. An image-side surface of the negative meniscus lens L11 and an image-side surface of the negative meniscus lens L12 are aspherical surfaces, respectively.

The second lens group G2 consists of a biconvex positive lens L21 and a cemented lens of a negative meniscus lens L22 having a concave surface facing the image side and a positive meniscus lens L23 having a concave surface facing the image side, which are disposed in order from an object.

The third lens group G3 consists of a positive meniscus lens L31 having a concave surface facing the image side and a cemented lens of a negative meniscus lens L32 having a concave surface facing the image side and a biconvex positive lens L33, which are disposed in order from an object. An image-side surface of the biconvex positive lens L33 is an aspherical surface.

The fourth lens group G4 consists of a biconcave negative lens L41. The fifth lens group G5 consists of a cemented lens of a negative meniscus lens L51 having a concave surface facing an image side and a biconvex positive lens L52. The fourth lens group G4, the fifth lens group G5, and the third lens group G3 are combined to form a rear lens group GR. An image-side surface of the biconvex positive lens L52 is an aspherical surface.

In the zoom lens ZL(3), focusing from infinity (long-distance object) to a short-distance object is performed when the fourth lens group G4 is moved in a direction of the image surface.

As indicated by arrows in FIG. 5, the zoom lens ZL(3) according to Example 3 has a configuration in which the first lens group G1 is moved toward the image side and the second to fifth lens groups G2 to G5 are moved toward the object side upon zooming from the wide angle end state to the telephoto end state. The aperture stop S moves integrally with the second lens group G2 upon zooming. Upon zooming from the wide angle end state to the telephoto end state in this way, a distance between the first lens group G1 and the second lens group G2 is reduced. In addition, the second lens group G2 and the fifth lens group G5 have the same movement path upon zooming.

The following Table 3 lists values of data of the optical system according to Example 3.

TABLE 3

[Lens Data]

| Surface Number | R | D | vd | nd |
|---|---|---|---|---|
| 1 | 152.68820 | 3.000 | 53.31 | 1.69370 |
| *2 | 15.55620 | 8.357 | | |
| 3 | 38.53240 | 2.955 | 46.77 | 1.76546 |
| *4 | 26.42970 | 8.354 | | |
| 5 | −57.53130 | 1.847 | 46.50 | 1.80420 |
| 6 | 93.52020 | 0.100 | | |
| 7 | 49.33710 | 5.000 | 29.13 | 2.00100 |
| 8 | −175.05800 | D1 | | |
| 9 | 39.75280 | 3.000 | 82.57 | 1.49782 |
| 10 | −1718.80820 | 0.100 | | |
| 11 | 25.06030 | 1.500 | 44.85 | 1.74397 |
| 12 | 14.25220 | 3.000 | 62.67 | 1.50163 |
| 13 | 133.78880 | 2.000 | | |
| 14 | ∞ | D2 | (Aperture Stop S) | |
| 15 | 27.62150 | 2.000 | 70.40 | 1.48749 |
| 16 | 40.08290 | 3.000 | | |
| 17 | 36.81870 | 1.500 | 44.85 | 1.74397 |
| 18 | 12.66940 | 3.500 | 71.68 | 1.55332 |
| *19 | −55.55510 | D3 | | |
| 20 | −115.52620 | 2.000 | 40.66 | 1.88300 |
| 21 | 172.71080 | D4 | | |
| 22 | 74.31210 | 2.000 | 45.57 | 1.73496 |
| 23 | 17.17290 | 7.000 | 63.88 | 1.51680 |
| *24 | −60.86760 | Bf | | |

[Aspherical Surface Data]

| Aspherical Surface | κ | A4 | A6 |
|---|---|---|---|
| 2nd Surface | −1.00000 | −3.02541E−06 | −3.52943E−08 |
| 4th Surface | −1.00000 | 2.29497E−05 | 6.39122E−08 |
| 19th Surface | 0.00000 | −6.57962E−07 | −7.31304E−08 |
| 24th Surface | −1.00000 | 1.46455E−05 | 1.65839E−09 |

| Aspherical Surface | A8 | A10 | A12 |
|---|---|---|---|
| 2nd Surface | 3.90600E−11 | −7.28685E−15 | — |
| 4th Surface | −4.07253E−11 | 9.08597E−14 | 6.7713E−16 |
| 19th Surface | 5.86633E−10 | −9.34166E−12 | — |
| 24th Surface | 1.35320E−10 | −1.34392E−12 | — |

TABLE 3-continued

[General Data]

f = 14.425~20.003~29.112
FNO = 4.10~4.10~4.10
ω = 57.87°~47.98°~35.78°
Y = 21.70~21.70~21.70

[Variable Distance Data]

|    | wide    | middle  | tele    |
|----|---------|---------|---------|
| D1 | 31.558  | 16.828  | 3.888   |
| D2 | 8.342   | 3.928   | 2.244   |
| D3 | 2.000   | 2.000   | 6.130   |
| D4 | 3.537   | 7.950   | 5.504   |
| Bf | 22.847  | 28.545  | 37.016  |
| Entire Length | 128.497 | 119.464 | 114.996 |

[Lens Group Data]

| f1 | −22.803 |
|----|---------|
| f2 | 44.561  |
| f3 | 49.665  |
| f4 | −78.141 |
| f5 | 171.534 |

[Conditional Expression Corresponding Value]

Conditional Expression(1) f1/fE = −0.133
Conditional Expression(2) f1/fF = 0.292
Conditional Expression(3) f2/fF = −0.570
Conditional Expression(4) −f1/f2 = 0.512
Conditional Expression(5) Bfw/fw = 1.584
Conditional Expression(6) −f1/f2Rw = 0.682
Conditional Expression(7) f1/fEw = 0.142
Conditional Expression(8) −f1/fRw = 0.310
Conditional Expression(9) ωw = 57.87°

As shown in Table of "Conditional Expression Corresponding Value" described above, the zoom lens ZL(3) according to Example 3 illustrated in FIG. 5 satisfies the conditional expressions (1) to (9) described above.

Figure 6C:
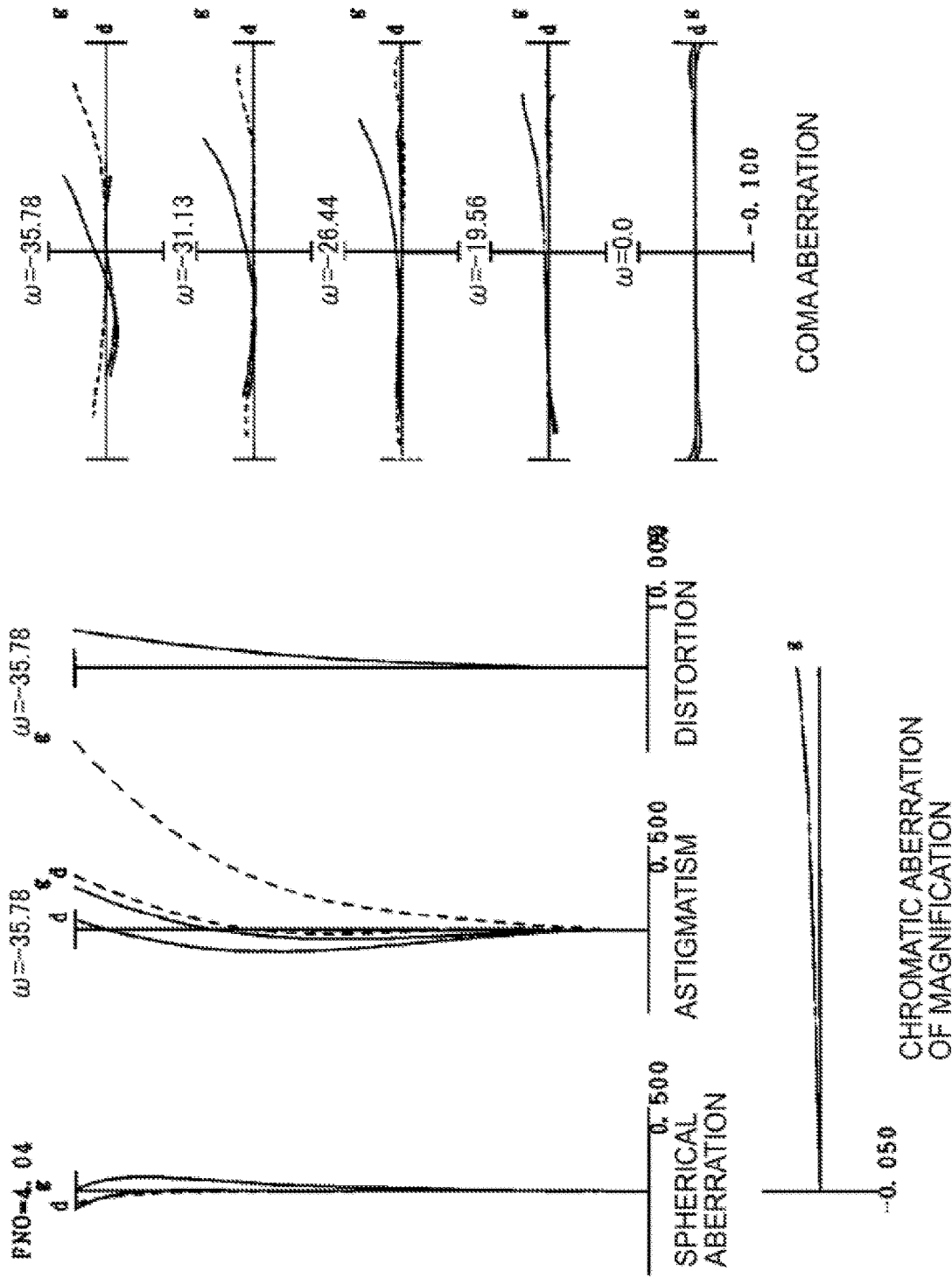

FIGS. 6A, 6B, and 6C are various aberration graphs (a spherical aberration graph, an astigmatism graph, a distortion graph, a coma aberration graph, and a chromatic aberration-of-magnification graph) of the zoom lens ZL(3) according to Example 3 in a wide angle end state, an intermediate focal length state, and a telephoto end state upon focusing on infinity. As can be seen from the various aberration graphs, the zoom lens ZL(3) according to Example 3 corrects various aberrations well from the wide angle end state to the telephoto end state, and has excellent imaging performance.

Example 4

Example 4 will be described with reference to FIGS. 7 and 8 and Table 4. FIG. 7 is a diagram illustrating a lens configuration of the zoom lens ZL(4) according to Example 4 of the present embodiment. The zoom lens ZL(4) includes a first lens group G1 having negative refractive power, a second lens group G2 having positive refractive power, a third lens group G3 having negative refractive power, and a fourth lens group G4 having negative refractive power which are disposed in order from an object. In this example, the third lens group G3 and the fourth lens group G4 form a rear lens group GR. In the rear lens group GR, in order from a side closest to an image, the fourth lens group G4 forms a last lens group GE, the third lens group G3 forms an F lens group GF, and the third lens group G3 (F lens group GF) forms a focusing lens group.

An aperture stop S is disposed inside the second lens group G2, and moves in an optical axis direction together the second lens group G2. On an image side of the fourth lens group G4, an image surface I is located.

Upon zooming, the first to fourth lens groups G1 to G4 move in optical axis directions as indicated by arrows in FIG. 7, respectively. Distances between the respective lens groups caused by the movement, that is, distances to the next lens surface D1, D2, and D3 shown in "Lens Data" of Table 4 are variable, and values of the distances are shown in a column of "Variable Distance Data".

The first lens group G1 consists of a negative meniscus lens L11 having a concave surface facing the image side, a negative meniscus lens L12 having a concave surface facing the image side, a biconcave negative lens L13, and a biconvex positive lens L14 which are disposed in order from an object. An image-side surface of the negative meniscus lens L11 and an image-side surface of the negative meniscus lens L12 are aspherical surfaces, respectively.

The second lens group G2 consists of a positive meniscus lens L21 having a concave surface facing the image side, a cemented lens of a negative meniscus lens L22 having a concave surface facing the image side and a positive meniscus lens L23 having a concave surface facing the image side, and a biconvex positive lens L24 which are disposed in order from an object.

The third lens group G3 consists of a negative meniscus lens L31 having a convex surface facing the image side. An image-side surface of the negative meniscus lens L31 is an aspherical surface. The third lens group G3 forms a focusing lens group GF.

The fourth lens group G4 consists of a biconvex positive lens L41 and a biconcave negative lens L42. The fourth lens group G4 and the third lens group G3 form a rear lens group GR. An object-side surface of the negative lens L42 is an aspherical surface.

In the zoom lens ZL(4), focusing from infinity (long-distance object) to a short-distance object is performed when the third lens group G3 forming the focusing lens group GF is moved in a direction of the image surface.

As indicated by arrows in FIG. 7, the zoom lens ZL(4) according to Example 4 has a configuration in which the first lens group G1 is moved toward the image side and the second to fourth lens groups G2 to G4 are moved toward the object side upon zooming from the wide angle end state to the telephoto end state. The aperture stop S moves integrally with the second lens group G2 upon zooming. Upon zooming from the wide angle end state to the telephoto end state in this way, a distance between the first lens group G1 and the second lens group G2 is reduced. In addition, the second lens group G2 and the fourth lens group G4 have the same movement path upon zooming.

The following Table 4 lists values of data of the optical system according to Example 4.

TABLE 4

[Lens Data]

| Surface Number | R | D | vd | nd |
|---|---|---|---|---|
| 1 | 143.42360 | 1.847 | 47.27 | 1.77377 |
| *2 | 19.73580 | 7.301 | | |
| 3 | 40.25320 | 2.955 | 46.76 | 1.76546 |
| *4 | 22.69740 | 9.439 | | |
| 5 | −87.02160 | 1.847 | 40.66 | 1.88300 |
| 6 | 64.64980 | 0.100 | | |

TABLE 4-continued

| | | | | |
|---|---|---|---|---|
| 7 | 37.85550 | 6.000 | 25.26 | 1.90200 |
| 8 | −193.93520 | D1 | | |
| 9 | 33.00090 | 2.493 | 36.96 | 1.74776 |
| 10 | 116.22960 | 0.100 | | |
| 11 | 28.47880 | 2.025 | 37.18 | 1.83400 |
| 12 | 11.76190 | 4.000 | 82.57 | 1.49782 |
| 13 | 194.58320 | 2.000 | | |
| 14 | ∞ | 5.968 | (Aperture Stop S) | |
| 15 | 23.38410 | 6.000 | 82.57 | 1.49782 |
| 16 | −25.16850 | D2 | | |
| 17 | −32.91040 | 2.000 | 47.26 | 1.77377 |
| *18 | −479.55090 | D3 | | |
| 19 | 37.69510 | 4.500 | 82.57 | 1.49782 |
| 20 | −58.87610 | 2.500 | | |
| *21 | −31.51450 | 2.000 | 40.17 | 1.85135 |
| 22 | 610.49000 | Bf | | |

[Aspherical Surface Data]

| Aspherical Surface | κ | A4 | A6 |
|---|---|---|---|
| 2nd Surface | −1.33200 | −9.41293E−06 | −3.20026E−08 |
| 4th Surface | −7.50410 | 1.06031E−04 | −2.03530E−07 |
| 18th Surface | 0.00000 | −2.83335E−05 | −8.65856E−08 |
| 21st Surface | 3.36500 | −6.30534E−05 | −2.78346E−07 |

| Aspherical Surface | A8 | A10 |
|---|---|---|
| 2nd Surface | 8.15624E−11 | −5.06181E−14 |
| 4th Surface | 1.08502E−09 | −1.13123E−12 |
| 18th Surface | −9.10000E−12 | −3.69900E−13 |
| 21st Surface | 5.71867E−10 | −1.54341E−11 |

[General Data]

f = 14.420~20.000~29.101
FNO = 4.10~4.10~4.10
ω = 57.95°~47.98°~35.90°
Y = 21.70~21.70~21.70

[Variable Distance Data]

| | wide | middle | tele |
|---|---|---|---|
| D1 | 29.236 | 15.205 | 3.623 |
| D2 | 1.593 | 2.038 | 2.786 |
| D3 | 3.886 | 3.441 | 2.693 |
| Bf | 21.267 | 27.363 | 36.916 |
| Entire Length | 119.057 | 111.123 | 109.096 |

[Lens Group Data]

| | |
|---|---|
| f1 | −23.718 |
| f2 | 22.703 |
| f3 | −45.756 |
| f4 | −224.939 |

[Conditional Expression Corresponding Value]

Conditional Expression(1) f1/fE = 0.105
Conditional Expression(2) f1/fF = 0.518
Conditional Expression(3) f2/fF = −0.496
Conditional Expression(4) −f1/f2 = 1.045
Conditional Expression(5) Bfw/fw = 1.475
Conditional Expression(6) −f1/f2Rw = 0.823
Conditional Expression(7) f1/fFEw = 0.703
Conditional Expression(8) −f1/fRw = −0.703
Conditional Expression(9) ωw = 57.95°

As shown in Table of "Conditional Expression Corresponding Value" described above, the zoom lens ZL(4) according to Example 4 illustrated in FIG. 7 satisfies the conditional expressions (1) to (9) described above.

FIGS. 8A, 8B, and 8C are various aberration graphs (a spherical aberration graph, an astigmatism graph, a distortion graph, a coma aberration graph, and a chromatic aberration-of-magnification graph) of the zoom lens ZL(4) according to Example 4 in a wide angle end state, an intermediate focal length state, and a telephoto end state upon focusing on infinity. As can be seen from the various aberration graphs, the zoom lens ZL(4) according to Example 4 corrects various aberrations well from the wide angle end state to the telephoto end state, and has excellent imaging performance.

Example 5

Example 5 will be described with reference to FIGS. 9 and 10 and Table 5. FIG. 9 is a diagram illustrating a lens configuration of the zoom lens ZL(5) according to Example 5 of the present embodiment. The zoom lens ZL(5) includes a first lens group G1 having negative refractive power, a second lens group G2 having positive refractive power, a third lens group G3 having positive refractive power, and a fourth lens group G4 having negative refractive power which are disposed in order from an object. In this example, the third lens group G3 and the fourth lens group G4 form a rear lens group GR. In the rear lens group GR, in order from a side closest to an image, the fourth lens group G4 forms a last lens group GE, the third lens group G3 forms an F lens group GF, and the third lens group G3 (F lens group GF) forms a focusing lens group.

An aperture stop S is disposed on an image side of the second lens group G2, and moves in an optical axis direction together the third lens group G3. On an image side of the fourth lens group G4, an image surface I is located.

Upon zooming, the first to fourth lens groups G1 to G4 move in optical axis directions as indicated by arrows in FIG. 9, respectively. Distances between the respective lens groups caused by the movement, that is, distances to the next lens surface D1, D2, and D3 shown in "Lens Data" of Table 5 are variable, and values of the distances are shown in a column of "Variable Distance Data".

The first lens group G1 consists of a negative meniscus lens L11 having a concave surface facing the image side, a negative meniscus lens L12 having a concave surface facing the image side, a biconcave negative lens L13, and a biconvex positive lens L14 which are disposed in order from an object. An image-side surface of the negative meniscus lens L11 and an image-side surface of the negative meniscus lens L12 are aspherical surfaces, respectively.

The second lens group G2 consists of a positive meniscus lens L21 having a concave surface facing the image side and a cemented lens of a negative meniscus lens L22 having a concave surface facing the image side and a positive meniscus lens L23 having a concave surface facing the image side which are disposed in order from an object.

The third lens group G3 consists of a biconvex positive lens L31 and a negative meniscus lens L32 having a convex surface facing the image side. An image-side surface of the negative meniscus lens L32 is an aspherical surface.

The fourth lens group G4 consists of a cemented lens of a biconcave negative lens L41 and a biconvex positive lens L42. The fourth lens group G4 and the third lens group G3 form a rear lens group GR. An image-side surface of the biconvex positive lens L42 is an aspherical surface.

In the zoom lens ZL(5), focusing from infinity (long-distance object) to a short-distance object is performed when the third lens group G3 is moved in a direction of the object surface.

As indicated by arrows in FIG. 9, the zoom lens ZL(5) according to Example 5 has a configuration in which the first lens group G1 is moved toward the image side and second to fourth lens groups G2 to G4 are moved toward the object side upon zooming from the wide angle end state to the telephoto end state. The aperture stop S moves integrally with the second lens group G2 upon zooming. Upon zooming from the wide angle end state to the telephoto end state in this way, a distance between the first lens group G1 and the second lens group G2 is reduced. In addition, the second lens group G2 and the fourth lens group G4 have the same movement path upon zooming.

The following Table 5 lists values of data of the optical system according to Example 5.

TABLE 5

[Lens Data]

| Surface Number | R | D | vd | nd |
|---|---|---|---|---|
| 1 | 93.21240 | 1.847 | 53.30 | 1.69370 |
| *2 | 13.52240 | 5.931 | | |
| 3 | 29.89960 | 2.955 | 46.76 | 1.76546 |
| *4 | 20.20150 | 9.371 | | |
| 5 | −56.70350 | 1.847 | 44.85 | 1.74397 |
| 6 | 78.54540 | 0.100 | | |
| 7 | 38.64210 | 8.000 | 30.65 | 1.69256 |
| 8 | −69.11270 | D1 | | |
| 9 | 20.04870 | 3.000 | 82.57 | 1.49782 |
| 10 | 72.62870 | 0.100 | | |
| 11 | 27.61350 | 1.500 | 44.85 | 1.74397 |
| 12 | 10.84710 | 5.500 | 55.25 | 1.52004 |
| 13 | 593.20040 | 2.000 | | |
| 14 | ∞ | D2 | (Aperture Stop S) | |
| 15 | 25.23910 | 6.000 | 82.57 | 1.49782 |
| 16 | −20.00280 | 0.100 | | |
| 17 | −35.40880 | 2.000 | 40.17 | 1.85135 |
| *18 | −716.06180 | D3 | | |
| 19 | −69.18060 | 2.000 | 44.91 | 1.74319 |
| 20 | 16.99120 | 9.000 | 63.88 | 1.51680 |
| *21 | −50.41600 | Bf | | |

[Aspherical Surface Data]

| Aspherical Surface | κ | A4 | A6 |
|---|---|---|---|
| 2nd Surface | −1.00000 | 1.38355E−06 | 2.07620E−08 |
| 4th Surface | −1.00000 | 3.59847E−05 | 2.08880E−08 |
| 18th Surface | −1.00000 | 2.70717E−05 | 3.79198E−08 |
| 21st Surface | −1.00000 | 1.19458E−05 | 6.17241E−08 |

| Aspherical Surface | A8 | A10 | A12 |
|---|---|---|---|
| 2nd Surface | −1.89816E−10 | 5.02341E−13 | — |
| 4th Surface | 4.46280E−10 | −1.00580E−12 | 1.42060E−17 |
| 18th Surface | 3.60945E−10 | 1.44176E−12 | — |
| 21st Surface | −3.96485E−10 | 3.16643E−13 | — |

[General Data]

f = 14.420~20.000~29.100
FNO = 4.10~4.10~4.10
ω = 58.12°~48.25°~36.38°
Y = 21.70~21.70~21.70

[Variable Distance Data]

| | wide | middle | tele |
|---|---|---|---|
| D1 | 27.410 | 13.108 | 1.500 |
| D2 | 7.612 | 6.891 | 5.627 |
| D3 | 4.000 | 4.721 | 5.985 |
| Bf | 21.168 | 28.042 | 38.588 |
| Entire Length | 121.440 | 114.013 | 112.952 |

[Lens Group Data]

| f1 | −22.394 |
|---|---|
| f2 | 41.067 |
| f3 | 46.152 |
| f4 | −80.774 |

TABLE 5-continued

[Conditional Expression Corresponding Value]

Conditional Expression(1) f1/fE = 0.277
Conditional Expression(2) f1/fF = −0.485
Conditional Expression(3) f2/fF = 0.890
Conditional Expression(4) −f1/f2 = 0.545
Conditional Expression(5) Bfw/fw = 1.468
Conditional Expression(6) −f1/f2Rw = 0.708
Conditional Expression(7) f1/fFEw = −0.233
Conditional Expression(8) −f1/fRw = 0.233
Conditional Expression(9) ωw = 58.12°

As shown in Table of "Conditional Expression Corresponding Value" described above, the zoom lens ZL(5) according to Example 5 illustrated in FIG. 9 satisfies the conditional expressions (1) to (9) described above.

FIGS. 10A, 10B, and 10C are various aberration graphs (a spherical aberration graph, an astigmatism graph, a distortion graph, a coma aberration graph, and a chromatic aberration-of-magnification graph) of the zoom lens ZL(5) according to Example 5 in a wide angle end state, an intermediate focal length state, and a telephoto end state upon focusing on infinity. As can be seen from the various aberration graphs, the zoom lens ZL(5) according to Example 5 corrects various aberrations well from the wide angle end state to the telephoto end state, and has excellent imaging performance.

Example 6

Example 6 will be described with reference to FIGS. 11 and 12 and Table 6. FIG. 11 is a diagram illustrating a lens configuration of the zoom lens ZL(6) according to Example 6 of the present embodiment. The zoom lens ZL(6) includes a first lens group G1 having negative refractive power, a second lens group G2 having positive refractive power, a third lens group G3 having positive refractive power, and a fourth lens group G4 having negative refractive power which are disposed in order from an object. In this example, the third lens group G3 and the fourth lens group G4 form a rear lens group GR. In the rear lens group GR, in order from a side closest to an image, the fourth lens group G4 forms a last lens group GE, the third lens group G3 forms an F lens group GF, and a lens L35 on a side closest to the image of the third lens group G3 (F lens group GF) forms a focusing lens group.

An aperture stop S, for determining brightness, is disposed on an image side of the second lens group G2. The aperture stop S is disposed independently of the second lens group G2, but moves in an optical axis direction together the second lens group G2. On an image side of the fourth lens group G4, an image surface I is located.

Upon zooming, the first to fourth lens groups G1 to G4 move in optical axis directions as indicated by arrows in FIG. 11, respectively. Distances between the respective lens groups caused by the movement, that is, distances to the next lens surface D1, D2, and D3 shown in "Lens Data" of Table 6 are variable, and values of the distances are shown in a column of "Variable Distance Data".

The first lens group G1 consists of a negative meniscus lens L11 having a concave surface facing the image side, a negative meniscus lens L12 having a concave surface facing the image side, a biconcave negative lens L13, and a positive meniscus lens L14 having a concave surface facing the image side which are disposed in order from an object. An image-side surface of the negative meniscus lens L11 and an image-side surface of the negative meniscus lens L12 are aspherical surfaces, respectively.

The second lens group G2 consists of a biconvex positive lens L21 and a cemented lens of a negative meniscus lens L22 having a concave surface facing the image side and a positive meniscus lens L23 having a concave surface facing the image side which are disposed in order from an object.

The third lens group G3 consists of a cemented lens of a negative meniscus lens L31 having a concave surface facing the image side and a positive meniscus lens L32 having a concave surface facing the image side, a biconvex positive lens L33, a biconvex positive lens L34, and a negative meniscus lens L35 having a concave surface facing the image side which are disposed in order from an object. An image-side surface of the positive meniscus lens L32 is an aspherical surface.

The fourth lens group G4 consists of a positive meniscus lens L41 having a convex surface facing the image side and a biconcave negative lens L42. The fourth lens group G4 and the third lens group G3 are combined to form a rear lens group GR. An object-side surface of the negative lens L42 is an aspherical surface.

In the zoom lens ZL(6), focusing from infinity (long-distance object) to a short-distance object is performed when the lens L35 on a side closest to the image of the third lens group G3 is moved in a direction of the image surface.

As indicated by arrows in FIG. 11, the zoom lens ZL(6) according to Example 6 has a configuration in which the first lens group G1 is moved toward the image side and the second to fourth lens groups G2 to G4 are moved toward the object side upon zooming from the wide angle end state to the telephoto end state. The aperture stop S moves integrally with the second lens group G2 upon zooming. Upon zooming from the wide angle end state to the telephoto end state in this way, a distance between the first lens group G1 and the second lens group G2 is reduced. In addition, the second lens group G2 and the fourth lens group G4 have the same movement path upon zooming.

The following Table 6 lists values of data of the optical system according to Example 6.

TABLE 6

[Lens Data]

| Surface Number | R | D | νd | nd |
|---|---|---|---|---|
| 1 | 59.8522 | 3.000 | 53.32 | 1.69370 |
| *2 | 20.0478 | 9.500 | | |
| 3 | 114.7269 | 2.900 | 53.32 | 1.69370 |
| *4 | 22.1986 | 11.955 | | |
| 5 | −224.8102 | 1.900 | 82.57 | 1.49782 |
| 6 | 31.3956 | 0.665 | | |
| 7 | 29.3038 | 4.500 | 35.73 | 1.90265 |
| 8 | 98.7168 | D1 | | |
| 9 | 331.6158 | 2.000 | 67.00 | 1.59349 |
| 10 | −82.5907 | 1.205 | | |
| 11 | 22.2836 | 1.200 | 40.66 | 1.88300 |
| 12 | 12.6519 | 4.500 | 56.00 | 1.56883 |
| 13 | 163.3779 | 2.500 | | |
| 14 | ∞ | D2 | (Aperture Stop S) | |
| 15 | 27.8092 | 1.100 | 46.59 | 1.81600 |
| 16 | 12.6205 | 4.710 | 64.08 | 1.51612 |
| *17 | 59.9800 | 0.200 | | |
| 18 | 34.7740 | 3.150 | 82.57 | 1.49782 |
| 19 | −41.7717 | 0.250 | | |
| 20 | 76.1603 | 3.050 | 82.57 | 1.49782 |
| 21 | −41.4669 | 1.115 | | |
| 22 | 158.9131 | 1.000 | 45.31 | 1.79500 |
| 23 | 25.4250 | D3 | | |
| 24 | −179.2003 | 3.000 | 82.57 | 1.49782 |
| 25 | −29.1129 | 1.000 | | |
| *26 | −44.2756 | 1.400 | 46.75 | 1.76546 |
| 27 | 333.0581 | Bf | | |

[Aspherical Surface Data]

| Aspherical Surface | κ | A4 | A6 |
|---|---|---|---|
| 2nd Surface | −1.00000 | −5.37297E−06 | −2.45009E−08 |
| 4th Surface | −1.00000 | 3.94361E−05 | 1.22579E−07 |
| 17th Surface | 0.00000 | −4.54651E−07 | −1.25750E−07 |
| 26th Surface | −1.00000 | −2.29913E−05 | −3.91709E−08 |

| Aspherical Surface | A8 | A10 | A12 |
|---|---|---|---|
| 2nd Surface | 3.23042E−11 | −4.78483E−15 | — |
| 4th Surface | −5.49173E−10 | 3.15773E−12 | −5.51800E−15 |
| 17th Surface | 2.28790E−10 | −9.64769E−12 | — |
| 26th Surface | −5.02820E−11 | −2.37742E−13 | — |

[General Data]

$f = 14.430 \sim 20.010 \sim 29.110$
$FNO = 4.00 \sim 4.00 \sim 4.00$
$\omega = 57.66° \sim 46.96° \sim 35.32°$
$Y = 21.07 \sim 21.70 \sim 21.70$

[Variable Distance Data]

| | wide | middle | tele |
|---|---|---|---|
| D1 | 25.911 | 12.633 | 2.346 |
| D2 | 8.768 | 6.786 | 4.521 |
| D3 | 3.925 | 5.907 | 8.171 |
| Bf | 21.438 | 27.017 | 36.366 |
| Entire Length | 125.841 | 118.142 | 117.203 |

[Lens Group Data]

| | |
|---|---|
| f1 | −22.037 |
| f2 | 47.094 |
| f3 | 54.811 |
| f4 | −199.936 |

[Conditional Expression Corresponding Value]

Conditional Expression(1) f1/fE = 0.110
Conditional Expression(2) f1/fF = −0.402
Conditional Expression(3) f2/fF = 0.859
Conditional Expression(4) −f1/f2 = 0.468
Conditional Expression(5) Bfw/fw = 1.486
Conditional Expression(6) −f1/f2Rw = 0.739
Conditional Expression(7) f1/fFEw = −0.331
Conditional Expression(8) −f1/fRw = 0.331
Conditional Expression(9) ωw = 57.66°

As shown in Table of "Conditional Expression Corresponding Value" described above, the zoom lens ZL(6) according to Example 6 illustrated in FIG. 11 satisfies the conditional expressions (1) to (9) described above.

Figure 12A:
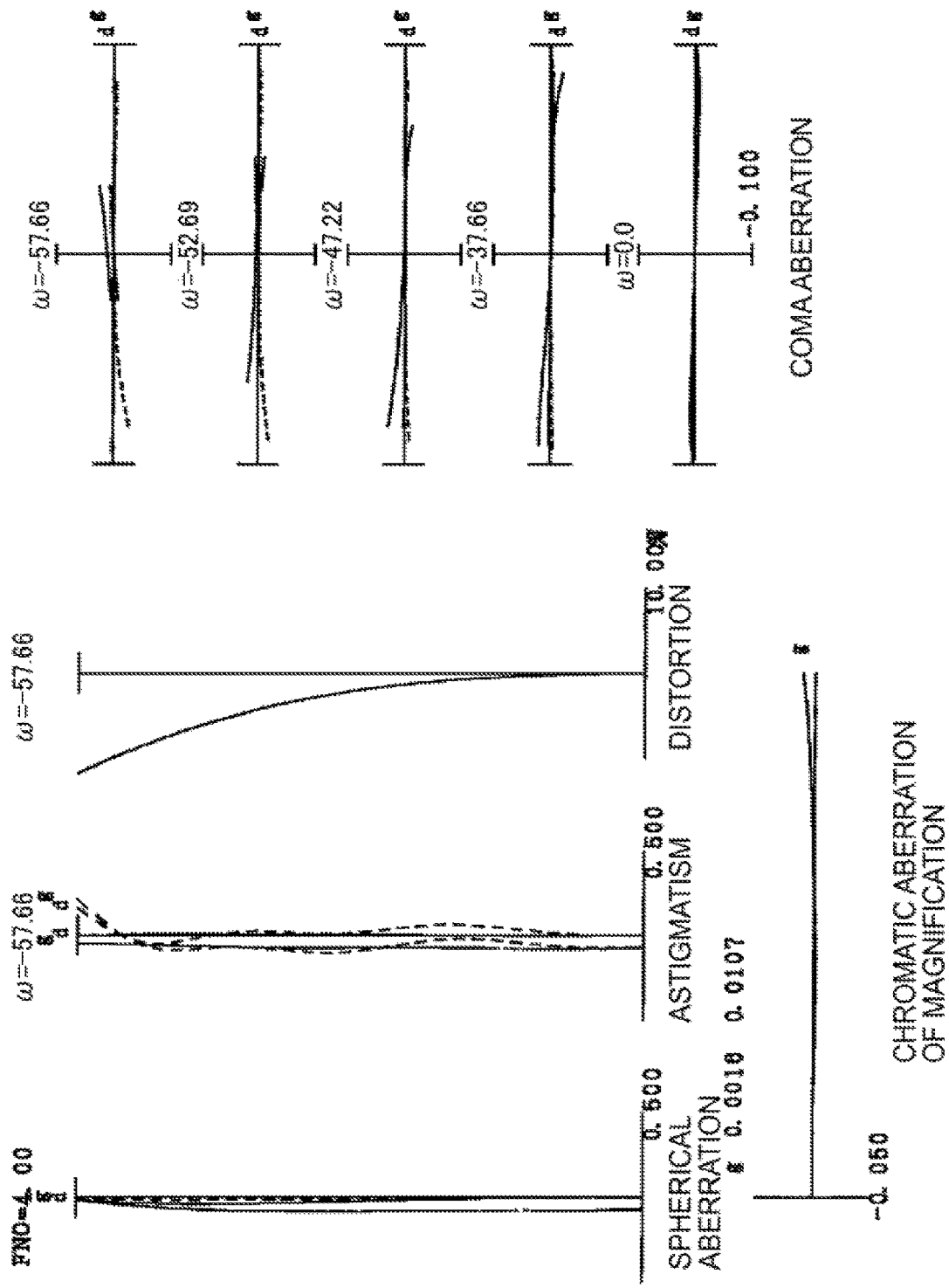

FIGS. 12A, 12B, and 12C are various aberration graphs (a spherical aberration graph, an astigmatism graph, a distortion graph, a coma aberration graph, and a chromatic aberration-of-magnification graph) of the zoom lens ZL(6) according to Example 6 in a wide angle end state, an intermediate focal length state, and a telephoto end state upon focusing on infinity. As can be seen from the various aberration graphs, the zoom lens ZL(6) according to Example 6 corrects various aberrations well from the wide angle end state to the telephoto end state, and has excellent imaging performance.

Each of Examples described above indicates one specific example of the present invention, and the present invention is not limited to these Examples.

The following contents can be appropriately employed within the range without impairing the optical performance of the zoom lens according to the present embodiment.

The configuration with the five groups or four groups are described as an example of the configuration of the zoom lens according to the present embodiments, but the present invention is not limited thereto. The present invention can be applied to a configuration of a zoom lens with other number of groups (for example, six groups or the like). More specifically, a configuration may be used in which a lens or a lens group is added to the zoom lens of the present embodiments on a side closest to an object or on a side closest to the image surface. The lens group is a portion including at least one lens separated from another lens with an air distance that varies upon zooming.

The zoom lens of the embodiments may be a focusing lens group in which the single or plurality of lens groups or part of lens groups are moved in the optical axis direction to perform focusing from the infinity distant object to the short-distance object. The focusing lens group can also be applied to autofocus, and can also be suitable for driving a motor for autofocus (using an ultrasonic motor or the like).

The zoom lens of the embodiments may be a vibration proof lens group in which the lens groups or part of lens groups are moved to have a component in a direction perpendicular to the optical axis or rotated (swing) in an in-plane direction including the optical axis to correct image blur caused by camera shake. At least a part of lenses in the lens group between the first lens group and the focusing lens group is preferably a vibration proof lens (vibration proof lens group).

The lens surface may be formed to have a spherical surface or a planer surface, or may be formed to have an aspherical shape. When the lens surface is a spherical surface or a planer surface, lens processing and assembly adjustment are facilitated and deterioration in optical performance due to errors in processing and assembly adjustment can be prevented, which is preferable. In this case, there is little deterioration in rendering performance even when the image surface deviates, which is preferable.

When the lens surface is an aspherical surface, the aspherical surface may be any one of aspherical surfaces formed by grinding, a glass-molded aspherical surface formed by molding a glass into an aspherical shape, and a composite type aspherical surface formed of a resin on a glass surface in an aspherical shape. Further, the lens surface may be a diffractive surface. The lens may be a gradient index lens (GRIN lens) or a plastic lens.

The aperture stop is preferably disposed in the neighborhood of the second lens group or in the second lens group, but a lens frame may serve as the aperture stop instead of the member serving as the aperture stop.

Each of the lens surfaces may be provided with an antireflection film having high transmittance in a wide wavelength range to reduce flare and ghost and achieve optical performance with high contrast.

EXPLANATION OF NUMERALS AND CHARACTERS

G1: first lens group
G2: second lens group
G3: third lens group
G4: fourth lens group
G5: fifth lens group
S: aperture stop
GR: rear lens group
GE: last lens group
GF: F lens group

The invention claimed is:

1. A zoom optical system comprising, in order from an object, a first lens group having negative refractive power, a second lens group having positive refractive power, and a rear lens group, wherein
lens groups forming the first lens group, the second lens group, and the rear lens group are arranged such that upon zooming, respective distances between the lens groups adjacent to each other change,
upon zooming from a wide-angle state to a telephoto state, the distance between the first lens group and the second lens group decreases,
the rear lens group comprises a third lens group having positive refractive power, which is disposed closest to an object in the rear lens group,
the zoom optical system further comprises a F lens group which is moved upon focusing, and
the following conditional expressions are satisfied:

$$-0.500 < f1/fF < 0.700$$

$$1.000 < Bfw/fw < 2.000$$

$$-1.000 < -f1/fRw < 0.600$$

where
f1: a focal length of the first lens group,
fF: a focal length of the F lens group,
Bfw: back focus of the zoom optical system in a wide angle end state,
fw: a focal length of the zoom optical system in the wide angle end state, and
fRw: a focal length of the rear lens group in a wide angle end state.

2. The zoom optical system according to claim 1, wherein lens groups forming the first lens group, the second lens group, and the rear lens group are arranged such that upon zooming, all these lens groups move.

3. The zoom optical system according to claim 1, wherein the rear lens group comprises a last lens group which is disposed closest to an image, and
the following conditional expression is satisfied:

$$-0.220 < f1/fE < 0.280$$

where
fE: a focal length of the last lens group.

4. The zoom optical system according to claim 1, wherein the following conditional expression is satisfied:

$$0.400 < -f1/f2 < 1.200$$

where
f1: a focal length of the first lens group, and
f2: a focal length of the second lens group.

5. The zoom optical system according to claim 1, wherein the following conditional expression is satisfied:

$$-1.500 < f2/fF < 0.950$$

where
f2: a focal length of the second lens group, and
fF: a focal length of the F lens group.

6. The zoom optical system according to claim 1, wherein the following conditional expression is satisfied:

$$0.100 < -f1/f2Rw < 1.600$$

where
f1: a focal length of the first lens group, and
f2Rw: a composite focal length of the second lens group and the rear lens group in a wide angle end state.

7. The zoom optical system according to claim 1, wherein the following conditional expression is satisfied:

$$-0.500 < f1/fFEw < 1.000$$

where
fFEW: a composite focal length of the F lens group and the last lens group in a wide angle end state.

8. The zoom optical system according to claim 1, wherein the following conditional expression is satisfied:

$$40.00° < \omega w < 80.00°$$

where
ωw: a half angle of view in a wide angle end state.

9. An optical apparatus on which the zoom optical system according to claim 1 is mounted.

10. A zoom optical system comprising, in order from an object, a first lens group having negative refractive power, a second lens group having positive refractive power, and a rear lens group, wherein
lens groups forming the first lens group, the second lens group, and the rear lens group are arranged such that upon zooming, all these lens groups move and respective distances between the lens groups adjacent to each other change,
the rear lens group comprises a third lens group having positive refractive power, which is disposed closest to an object in the rear lens group,
the rear lens group comprises a last lens group which is disposed closest to an image,
the rear lens group comprises a F lens group which is moved upon focusing, and
the following conditional expressions are satisfied:

$$-0.220 < f1/fE < 0.280$$

$$0.400 < -f1/f2 < 1.200$$

$$-0.500 < f1/fF < 0.700$$

where
f1: a focal length of the first lens group,
f2: a focal length of the second lens group,
fE: a focal length of the last lens group, and
fF: a focal length of the F lens group.

11. The zoom optical system according to claim 10, wherein
upon zooming from a wide-angle state to a telephoto state, the distance between the first lens group and the second lens group decreases.

12. The zoom optical system according to claim 10, wherein
the following conditional expressions is satisfied:

$$1.000 < Bfw/fw < 2.000$$

where
Bfw: back focus of the zoom optical system in a wide angle end state, and
fw: a focal length of the zoom optical system in the wide angle end state.

13. The zoom optical system according to claim 10, wherein
the following conditional expressions is satisfied:

$$-1.000 < -f1/fRw < 0.600$$

where
f1: a focal length of the first lens group, and
fRw: a focal length of the rear lens group in a wide angle end state.

14. An optical apparatus on which the zoom optical system according to claim 10 is mounted.

15. A method for manufacturing a zoom optical system comprising, in order from an object, a first lens group having negative refractive power, a second lens group having positive refractive power, and a rear lens group,
the method comprising either the following step A or the following step B,
the step A is to dispose the first lens group, the second lens group and the rear lens group in a lens barrel so that:
lens groups forming the first lens group, the second lens group, and the rear lens group are arranged such that upon zooming, respective distances between the lens groups adjacent to each other change,
upon zooming from a wide-angle state to a telephoto state, the distance between the first lens group and the second lens group decreases,
the rear lens group comprises a third lens group having positive refractive power, which is disposed closest to an object in the rear lens group,
the zoom optical system further comprises a F lens group which is moved upon focusing, and
the following conditional expressions are satisfied:

$$-0.500 < f1/fF < 0.700$$

$$1.000 < Bfw/fw < 2.000$$

$$-1.000 < -f1/fRw < 0.600$$

where
f1: a focal length of the first lens group,
fF: a focal length of the F lens group,
Bfw: back focus of the zoom optical system in a wide angle end state,
fw: a focal length of the zoom optical system in the wide angle end state, and
fRw: a focal length of the rear lens group in a wide angle end state, and
the step B is to dispose the first lens group, the second lens group and the rear lens group in a lens barrel so that:
lens groups forming the first lens group, the second lens group, and the rear lens group are arranged such that upon zooming, all these lens groups move and respective distances between the lens groups adjacent to each other change,
the rear lens group comprises a third lens group having positive refractive power, which is disposed closest to an object in the rear lens group,
the rear lens group comprises a last lens group which is disposed closest to an image,
the rear lens group comprises a F lens group which is moved upon focusing, and
the following conditional expressions are satisfied:

$$-0.220 < f1/fE < 0.280$$

$$0.400 < -f1/f2 < 1.200$$

$$-0.500 < f1/fF < 0.700$$

where
f1: a focal length of the first lens group,
f2: a focal length of the second lens group,
fE: a focal length of the last lens group, and
fF: a focal length of the F lens group.

* * * * *